(12) United States Patent
Cheng

(10) Patent No.: US 11,156,366 B2
(45) Date of Patent: Oct. 26, 2021

(54) DYNAMIC HEAT ADJUSTMENT OF A SPECTRAL POWER DISTRIBUTION CONFIGURABLE COOKING INSTRUMENT

(71) Applicant: Brava Home, Inc., Redwood City, CA (US)

(72) Inventor: Shih-yu Cheng, Union City, CA (US)

(73) Assignee: BRAVA HOME, INC., Redwood City, CA (US)

( * ) Notice: Subject to any disclaimer, the term of this patent is extended or adjusted under 35 U.S.C. 154(b) by 393 days.

(21) Appl. No.: 15/922,877

(22) Filed: Mar. 15, 2018

(65) Prior Publication Data

US 2018/0202667 A1    Jul. 19, 2018

Related U.S. Application Data

(63) Continuation-in-part of application No. 15/261,784, filed on Sep. 9, 2016, now Pat. No. 10,760,794.
(Continued)

(51) Int. Cl.
| | |
|---|---|
| *F24C 7/08* | (2006.01) |
| *H05B 6/64* | (2006.01) |
| *H05B 6/66* | (2006.01) |
| *H04N 7/18* | (2006.01) |
| *H05B 6/70* | (2006.01) |

(Continued)

(52) U.S. Cl.
CPC ............. *F24C 7/085* (2013.01); *H04N 5/232* (2013.01); *H04N 5/2354* (2013.01); *H04N 5/23229* (2013.01); *H04N 5/332* (2013.01); *H04N 7/183* (2013.01); *H05B 6/6441* (2013.01); *H05B 6/6444* (2013.01); *H05B 6/6467* (2013.01); *H05B 6/668* (2013.01); *H05B 6/705* (2013.01); *G10L 25/51* (2013.01); *H04N 5/2352* (2013.01); *H04N 5/2353* (2013.01);
(Continued)

(58) Field of Classification Search
CPC ........ F24C 7/085; H04N 5/332; H04N 5/232; H04N 5/23229; H04N 5/2354; H04N 5/23293; H04N 5/2352; H04N 5/2353; H04N 7/183; H04N 9/732; H05B 6/6444; H05B 6/6441; H05B 6/6467; H05B 6/668; H05B 6/705; Y02B 40/00; G10L 25/51

See application file for complete search history.

(56) References Cited

U.S. PATENT DOCUMENTS

| 3,407,285 A | 10/1968 | Jacobs |
| 4,117,294 A | 9/1978 | Appelquist et al. |

(Continued)

FOREIGN PATENT DOCUMENTS

| CN | 1892673 | 10/2007 |
| CN | 101398197 | 4/2009 |

(Continued)

*Primary Examiner* — Shawntina T Fuqua
(74) *Attorney, Agent, or Firm* — Haynes and Boone, LLP

(57) ABSTRACT

Several embodiments include a cooking instrument. The cooking instrument can include a heating system. The heating system can include one or more heating elements capable of emitting wireless energy into the cooking chamber. The cooking instrument can also include a control system. The control system can executing a heating sequence to drive the heating system, detect, based on an output signal of a sensor, a trigger event, and configure the heating system in response to detecting the trigger event.

28 Claims, 10 Drawing Sheets

Related U.S. Application Data

(60) Provisional application No. 62/249,456, filed on Nov. 2, 2015, provisional application No. 62/216,859, filed on Sep. 10, 2015, provisional application No. 62/218,942, filed on Sep. 15, 2015, provisional application No. 62/240,794, filed on Oct. 13, 2015, provisional application No. 62/256,626, filed on Nov. 17, 2015.

(51) Int. Cl.
| | | |
|---|---|---|
| *H04N 5/33* | (2006.01) | |
| *H04N 5/232* | (2006.01) | |
| *H04N 5/235* | (2006.01) | |
| *H04N 9/73* | (2006.01) | |
| *G10L 25/51* | (2013.01) | |

(52) U.S. Cl.
CPC ......... *H04N 5/23293* (2013.01); *H04N 9/735* (2013.01); *Y02B 40/00* (2013.01)

(56) References Cited

U.S. PATENT DOCUMENTS

| | | |
|---|---|---|
| 4,335,293 A | 6/1982 | Kobayashi et al. |
| 4,441,015 A | 4/1984 | Eichelberger |
| 4,473,732 A | 9/1984 | Payne |
| 4,475,024 A | 10/1984 | Tateda et al. |
| 4,771,154 A | 9/1988 | Bell et al. |
| 4,800,090 A | 1/1989 | August |
| 5,349,163 A | 9/1994 | An |
| 5,360,965 A | 11/1994 | Ishii et al. |
| 5,665,259 A | 9/1997 | Westerberg |
| 5,877,477 A | 3/1999 | Petty et al. |
| 5,990,454 A | 11/1999 | Westerberg et al. |
| 6,011,242 A | 1/2000 | Westerberg |
| 6,013,900 A | 1/2000 | Westerberg et al. |
| 6,069,345 A | 5/2000 | Westerberg |
| 6,302,095 B1 | 10/2001 | Tolley et al. |
| 6,417,494 B1 | 7/2002 | Westerberg et al. |
| 6,448,540 B1 | 9/2002 | Wilhelm et al. |
| 6,843,207 B2 | 1/2005 | Kanzaki et al. |
| 7,075,442 B2 | 7/2006 | Lion et al. |
| D541,578 S | 5/2007 | Jeon |
| 7,323,663 B2 | 1/2008 | Cavada et al. |
| D586,180 S | 2/2009 | Pino et al. |
| D602,306 S | 10/2009 | Lavy |
| 7,619,186 B2 | 11/2009 | Cavada et al. |
| 7,683,292 B2 | 3/2010 | Cavada et al. |
| D629,639 S | 12/2010 | Fernandez et al. |
| 8,200,548 B2 | 6/2012 | Wiedl |
| 8,791,398 B2 | 7/2014 | De la Cuerda Ortin et al. |
| 8,929,724 B1 | 1/2015 | Mograbi |
| 9,414,444 B2 | 8/2016 | Libman et al. |
| 9,460,633 B2 | 10/2016 | Minvielle |
| D771,995 S | 11/2016 | Bhogal et al. |
| D771,996 S | 11/2016 | Bhogal et al. |
| 9,528,972 B2 | 12/2016 | Minvielle |
| D777,504 S | 1/2017 | Bhogal et al. |
| D782,864 S | 4/2017 | Bhogal et al. |
| D783,336 S | 4/2017 | Suh et al. |
| D802,996 S | 11/2017 | Bhogal et al. |
| 9,927,129 B2 | 3/2018 | Bhogal et al. |
| 2002/0171674 A1 | 11/2002 | Paris |
| 2005/0173400 A1 | 8/2005 | Cavada et al. |
| 2006/0289436 A1 | 12/2006 | Carbone et al. |
| 2008/0259995 A1 | 10/2008 | Kuhn et al. |
| 2009/0034944 A1 | 2/2009 | Burtea et al. |
| 2009/0102083 A1 | 4/2009 | Cochran et al. |
| 2009/0272814 A1 | 11/2009 | Granhed et al. |
| 2010/0186600 A1 | 7/2010 | Lewis et al. |
| 2010/0199857 A1 | 8/2010 | Storiz et al. |
| 2011/0002675 A1 | 1/2011 | Cochran et al. |
| 2011/0002677 A1 | 1/2011 | Cochran et al. |
| 2011/0114627 A1 | 5/2011 | Burt |
| 2011/0114633 A1 | 5/2011 | Niklasson et al. |
| 2012/0063753 A1 | 3/2012 | Cochran et al. |
| 2012/0180775 A1 | 7/2012 | Waltz et al. |
| 2013/0202754 A1 | 8/2013 | Cochran et al. |
| 2014/0203012 A1* | 7/2014 | Corona ............... H05B 6/6447 219/705 |
| 2015/0289324 A1 | 10/2015 | Rober et al. |
| 2015/0330640 A1 | 11/2015 | Stork Genannt Wersborg |
| 2016/0033140 A1 | 2/2016 | Weaver, Jr. et al. |
| 2016/0192446 A1 | 6/2016 | Seddik |
| 2016/0327279 A1 | 11/2016 | Bhogal et al. |
| 2016/0348918 A1 | 12/2016 | Bhogal et al. |
| 2017/0074522 A1 | 3/2017 | Cheng et al. |
| 2017/0099988 A1 | 4/2017 | Matloubian et al. |
| 2017/0211819 A1 | 7/2017 | McKee et al. |
| 2017/0215233 A1 | 7/2017 | Katz et al. |

FOREIGN PATENT DOCUMENTS

| | | |
|---|---|---|
| CN | 102413712 | 4/2012 |
| DE | 10 2012 204229 | 9/2013 |
| EP | 1740018 | 1/2007 |
| EP | 2243407 | 10/2010 |
| EP | 2515044 | 10/2012 |
| EP | 2 662 628 | 11/2013 |
| FR | 2284243 A1 | 4/1976 |
| JP | 2002-156117 A | 5/2002 |
| JP | 2006-275489 A | 10/2006 |
| JP | 2009052817 | 3/2009 |
| RU | 2006102663 | 8/2007 |
| RU | 2007111953 | 10/2008 |
| RU | 2008111110 | 9/2009 |
| RU | 110892 | 11/2011 |
| WO | WO 97/09865 A1 | 3/1997 |
| WO | WO 98/030941 | 7/1998 |
| WO | WO2014086486 | 9/2004 |
| WO | W0 2009/091145 | 7/2009 |
| WO | WO 2014/086487 | 6/2014 |
| WO | WO 2017/044876 | 3/2017 |

\* cited by examiner

```
800
```

Hyperspectrally image, at least partially, a cooking chamber of the cooking instrument
802

Illuminating, at least partially, the cooking chamber with a lighting system
804

Capturing a spectral response image with at least two dimensions utilizing an imaging system
806

Identify a material in the cooking chamber by analyzing the spectral response image
808

Configure a heating system of the cooking instrument based on the determined presence of the material
810

*FIG. 8*

DYNAMIC HEAT ADJUSTMENT OF A SPECTRAL POWER DISTRIBUTION CONFIGURABLE COOKING INSTRUMENT

CROSS-REFERENCE TO RELATED APPLICATIONS

This application is a continuation-in-part of U.S. patent application Ser. No. 15/261,784, filed Sep. 9, 2016 that claims the benefit of U.S. Provisional Patent Application 62/249,456 filed Nov. 2, 2015; U.S. Provisional Patent Application No. 62/216,859 filed Sep. 10, 2015; U.S. Provisional Patent Application No. 62/218,942 filed Sep. 15, 2015; U.S. Provisional Patent Application No. 62/240,794 filed Oct. 13, 2015 and U.S. Provisional Patent Application No. 62/256,626 filed Nov. 17, 2015, which all are incorporated by reference herein in their entirety.

TECHNICAL FIELD

Various embodiments relate to cooking instruments, such as ovens.

BACKGROUND

The art of cooking remains an "art" at least partially because of the food industry's inability to help cooks to produce systematically award worthy dishes. To make a full course meal, a cook often has to use multiple cooking instruments, understand the heating patterns of the cooking instruments, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking instruments automatically. The industry has yet been able to create an intelligent cooking instrument capable of automatically and consistently producing complex meals with precision, speed, and lack of unnecessary human intervention.

BRIEF DESCRIPTION OF THE DRAWINGS

FIG. 8 is a flow chart illustrating a method of operating a cooking instrument, in accordance with various embodiments.

Figure 1:
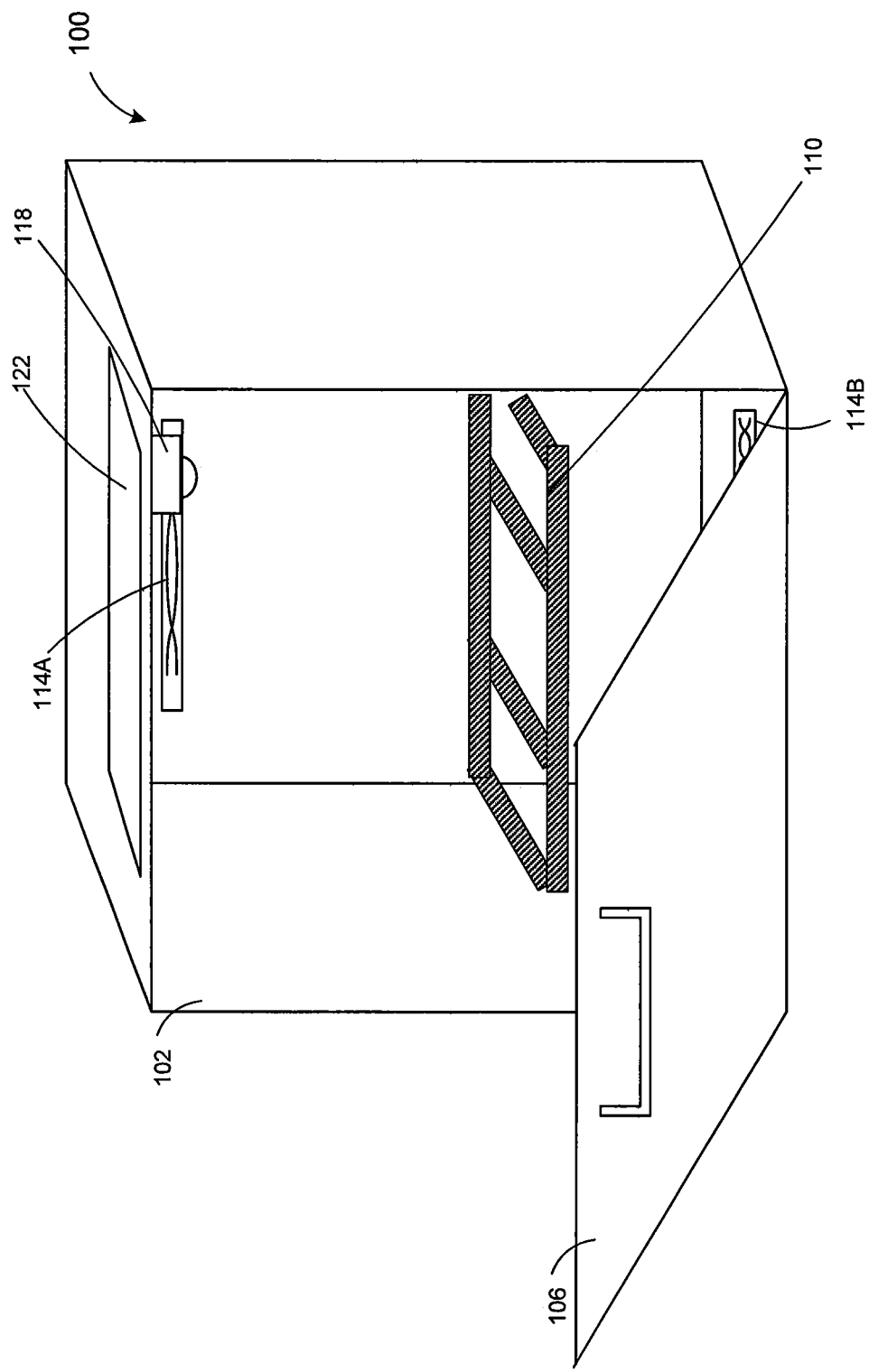
FIG. 1 is a structural diagram of a perspective view of a cooking instrument, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

A conventional oven cooks food within its chamber utilizing a single setting over a period of time. Cooking a complex dish (e.g., having multiple components) with such oven is either restricted by how well cooked all of the components together as a whole is or requires that only a subset of components be cooked at one time in the oven. Disclosed is a cooking instrument capable of: executing a heating sequence to drive a heating system; detecting, based on an open-ended data stream of a sensor, a trigger condition; and responsive to detecting the trigger event, adjusting the heating system. The sensor can be a microphone. The cooking instrument can monitor a continuous audio stream for sound of popping, boiling, sizzling, or other sound indicative of a change in phase or state of foodstuff in the cooking chamber. The sensor can be a volatile organic compound sensor. The cooking instrument can perform a particulate analysis to identify specific aerial material associated with a change in phase or state of foodstuff in the cooking chamber. The sensor can be a camera and the trigger event can be a fire presence event, a smoke presence event, a condensing steam presence event, or any combination thereof.

Several embodiments include a cooking instrument. The cooking instrument can include a heating system. The heating system can include one or more heating elements capable of emitting wireless energy into the cooking chamber. The cooking instrument can also include a control system. The control system can determine a heating sequence to drive the heating system. The control system can then execute the heating sequence. The heating sequence can include an instruction to adjust, based on a trigger event detectable by the control system, the spectral power distribution of wireless energy waves emitted from a heating element in the heating system. The control system can adjust the spectral power distribution by generating a control signal to a power supply or the heating system to pulse modulate the power provided to the heating element. The spectral power distribution can be a function of temperature of the heating element. By driving the temperature of the heating element to a target range and maintaining the temperature within the target range by the proper pulse modulation setting, the cooking instrument can tune the spectral power distribution of the heating element.

The heating system can be determined based on a food cooking recipe or a foodstuff selected or identified by the cooking instrument. A food cooking recipe is a set of parameters and configurations to the cooking instrument in order to prepare and cook a foodstuff dish. A food cooking recipe can also include one or more heating sequences or one or more instructions to generate such heating sequences. In some embodiments, each heating sequence in a food cooking recipe corresponds to a set of logical instructions to drive the heating system, where the set of logical instructions are expected to be executed in a sequence prior to the time when some amount of user intervention is needed to continue executing the food cooking recipe.

A heating sequence is a set of logical instructions to drive a heating system of the cooking instrument. The logical instructions can include configuration parameters specifying a particular setting of pulse modulation used to drive one or more heating elements of the heating system. The logical instructions can include one or more logical branches, each logical branch with one or more instructions of driving the heating system. Whether to execute a logical branch (e.g., execute once or repeatedly execute) can be determined by a trigger event. The trigger event can be a conditional precedent or a conditional subsequent. The logical instructions can include feedback control instructions to adjust the configuration parameters of the heating system.

FIG. 1 is a structural diagram of a perspective view of a cooking instrument 100, in accordance with various embodiments. The cooking instrument 100 can include a chamber 102 having a door 106. At least one cooking platform 110 is disposed inside the chamber 102. The cooking platform 110 can be a tray, a rack, or any combination thereof.

The cooking instrument 100 can include a heating system (not labeled in FIG. 1). The heating system can include one or more heating elements 114 (e.g., a heating element 114A, a heating element 114B, etc., collectively as the "heating elements 114"). The chamber 102 can be lined with the heating elements 114. Each of heating elements 114 can include a wavelength controllable filament assembly. The wavelength controllable filament assembly is capable of independently adjusting an emission spectral power distribution (hence also peak frequency and peak wavelength), emission power, and/or emission signal pattern in response to a command from a computing device (not shown) of the cooking instrument 100.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118 can be attached to an interior of the chamber 102. In some embodiments, the camera 118 is attached to the door 106. For example, the camera 118 can face inward toward the interior of the chamber 102 when the door 106 is closed and upward when the door 106 is opened as illustrated. In some embodiments, the camera 118 is installed on the ceiling (e.g., top interior surface) of the chamber 102. The camera 118 can be attached to the door 106 or proximate (e.g., within three inches) to the door 106 on the ceiling of the chamber 102 to enable easy cleaning, convenient scanning of labels, privacy, heat damage avoidance, etc.

In several embodiments, each of the heating elements 114 includes one or more wavelength-controllable filament assemblies at one or more locations in the chamber. In some embodiments, each of the one or more wavelength-controllable filament assemblies is capable of independently adjusting its emission spectral power distribution (e.g., peak emission frequency) and/or its emission power. For example, the peak emission frequency of the wavelength-controllable filament assemblies can be tuned within a broad band range (e.g. from 20 terahertz to 300 terahertz). Different frequencies can correspond to different penetration depth for heating the food substances, the cooking platform 110 or other items within the chamber 102, and/or parts of the cooking instrument 100.

The heating elements 114 can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking instrument 100 can hold the power constant while lowering the peak emission frequency by activating more heating elements, each at a lower power. The cooking instrument 100 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118 includes an infrared sensor to provide thermal images to the computing device as feedback to a dynamic heating sequence (e.g., a heat adjustment algorithm). In some embodiments, the cooking instrument 100 includes multiple cameras. In some embodiments, the camera 118 includes a protective shell. In some embodiments, the heating elements 114 and the camera 118 are disposed in the chamber 102 such that the camera 118 is not directly between any pairing of the heating elements. For example, the heating elements 114 can be disposed along two vertical walls perpendicular to the door 106. The heating elements 114 can be quartz tubes (e.g., with heating filaments therein) that run horizontally on the vertical walls and perpendicular to the door 106.

In some embodiments, a display 122 is attached to the door 106. In some embodiments, the display 122 is attached to an outward-facing surface of the chamber 102 other than the door 106 (as shown). The display 122 can be a touch-screen display. The display 122 can be attached to an exterior of the chamber 102 on an opposite side of the door 106 from the camera 118. The display 122 can be configured to display a real-time image or a real-time video of the interior of the chamber captured by and/or streamed from the camera 118.

Figure 2:
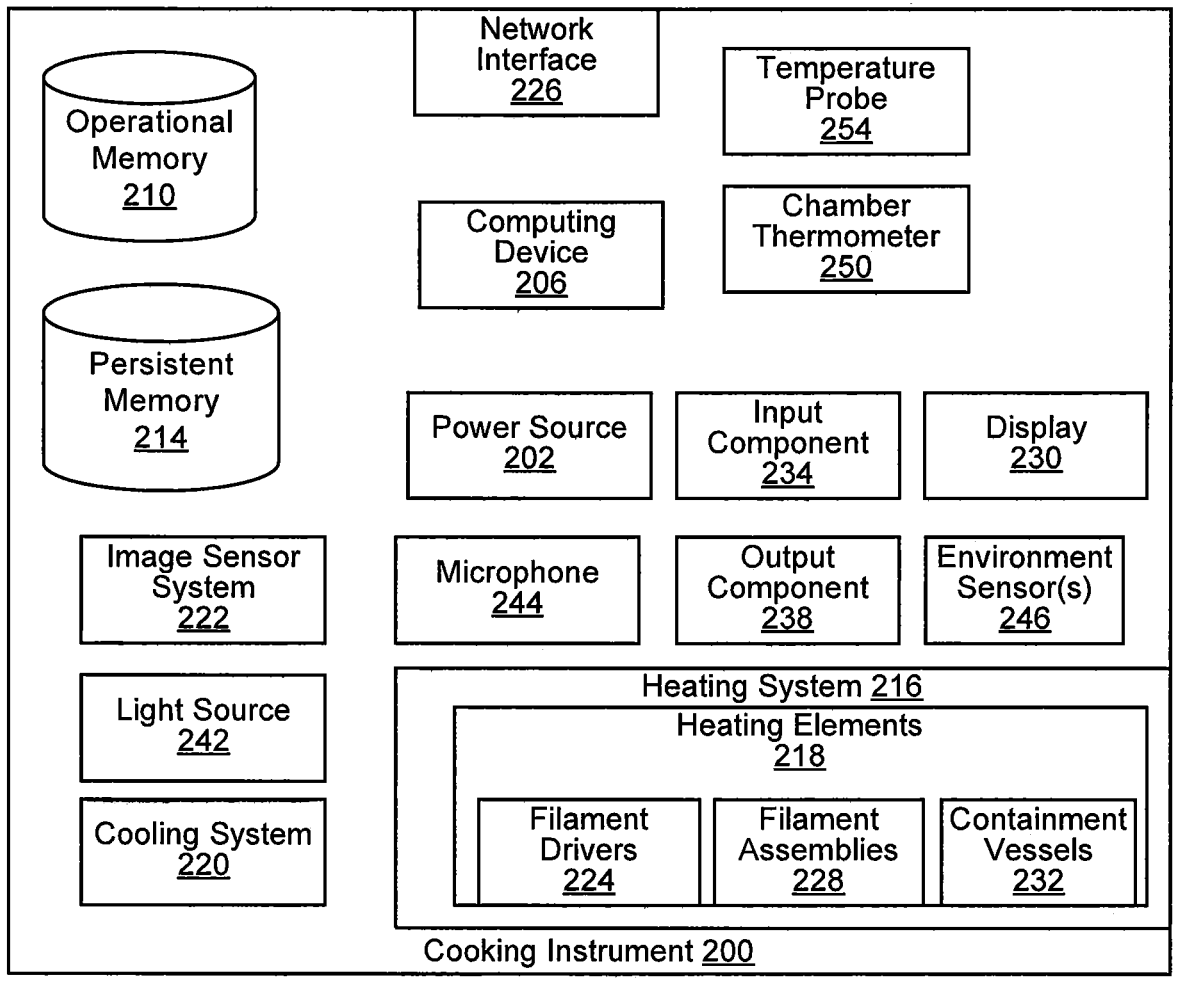
FIG. 2 is a block diagram illustrating physical components of a cooking instrument, in accordance with various embodiments.

FIG. 2 is a block diagram illustrating physical components of a cooking instrument 200 (e.g., the cooking instrument 100), in accordance with various embodiments. The cooking instrument 200 can include a power supply 202, a computing device 206, an operational memory 210, a persistent memory 214, a heating system 216 with one or more heating elements (e.g., a heating element 218A, a heating element 218B, etc., collectively as the "heating elements 218"), a cooling system 220, an image sensor system 222 (e.g., the camera 118), a network interface 226, a display 230 (e.g., the display 122), an input component 234, an output component 238, a light source 242, a microphone 244, one or more environment sensors 246, a chamber thermometer 250, a temperature probe 254, or any combination thereof. The heating elements 218 can be the heating elements 114. In some embodiments, each of the heating elements 218 is individually tunable (e.g., by the computing device 206) to change its emission spectral power distribution independent of others.

The computing device 206, for example, can be a control circuit. The computing device 206 serves as the control system for the cooking instrument 200. The control circuit can include an application-specific integrated circuit, a controller, or a circuit with a general-purpose processor configured by executable instructions stored in the operational memory 210 and/or the persistent memory 214. The computing device 106 can control all or at least a subset of the physical components and/or functional components of the cooking instrument 200.

The power supply 202 provides the power necessary to operate the physical components of the cooking instrument 200. For example, the power supply 202 can convert alternating current (AC) power to direct current (DC) power for the physical components. In some embodiments, the power supply 202 can run a first powertrain to the heating elements 218 and a second powertrain to the other components. In some cases, the first powertrain is an AC powertrain and the second powertrain is a DC powertrain.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes. Each cooking recipe can include one or more heating sequences containing executable instructions (e.g., executable by the computing device 206) to drive the heating elements 218. The operational memory 210 can provide runtime memory to execute the functional components of the computing device 206. In some embodiments, the persistent memory 214 and/or the operational memory 210 can store image files or video files captured by the image sensor system 222.

The heating elements 218 can be wavelength controllable (e.g., capable of changing its spectral power distribution). For example, the heating elements 218 can include quartz tubes, each enclosing one or more heating filaments. In various embodiments, the side of the quartz tubes facing toward the chamber wall instead of the interior of the chamber is coated with a heat resistant coating and/or a reflective coating. The operating temperature of the heating filaments can be extremely high. Hence, the cooling system 220 can provide cooling (e.g., convectional or otherwise) to prevent the heat resistant coating from melting or vaporizing.

The heating elements 218 can respectively include filament drivers (e.g., respectively a filament driver 224A and a filament driver 224B, collectively as the "filament drivers 224"), filament assemblies (e.g., respectively filament assembly 228A and filament assembly 228B, collectively as the "filament assemblies 228B"), and containment vessels (e.g., respectively containment vessel 232A and containment vessel 232B, collectively as the "containment vessels 232"). For example, each heating element can include a filament assembly housed by a containment vessel. The filament assembly can be driven by a filament driver. In turn, the filament driver can be controlled by the computing device 206. For example, the computing device 206 can instruct the power supply 202 to provide a set amount of power to the filament driver. In turn, the computing device 206 can instruct the filament driver to drive the filament assembly to generate electromagnetic waves (i.e., a form of wireless electromagnetic energy) with one or more selected peak wavelengths and/or other particular characteristics defining a spectral power distribution type.

The image sensor system 222 serves various functions in the operation of the cooking instrument 200. For example, the image sensor system 222 and the display 230 together can provide a virtual window to the inside of the chamber despite the cooking instrument 200 being windowless. The image sensor system 222 can serve as a food package label scanner that configures the cooking instrument 200 by recognizing a machine-readable optical label of the food packages. In some embodiments, the image sensor system 222 can enable the computing device 206 to use optical feedback when executing a cooking recipe. In several embodiments, the light source 242 can illuminate the interior of the cooking instrument 200 such that the image sensor system 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the image sensor system 222. The display 230 can also present a control interface implemented by the computing device 206. The input component 234 can be a touch panel overlaid with the display 230 (e.g., collectively as a touchscreen display). In some embodiments, the input component 234 is one or more mechanical devices (e.g., buttons, dials, switches, or any combination thereof). In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the image sensor system 222, from the microphone 244 as dynamic feedback to adjust the controls of the heating elements 218 in real-time according to a heat adjustment algorithm (e.g., a part of a dynamic heating sequence). In one example, the computing device 206 can detect an audio signal indicative of a fire alarm, a smoke alarm, popcorn being popped, or any combination thereof. For example, the computing device 206 can adjust the heating system 216 according to the detected audio signal, such as turning off the heating elements 218 in response to detecting an alarm or in response to detecting a series of popcorn noise followed by silence/low noise. The environment sensors 246 can include a pressure sensor, a humidity sensor, a smoke sensor, a pollutant sensor, or any combination thereof. For example, the pollutant sensors can be volatile organic compound (VOC) sensors, particulate sensors, or any combination thereof. The particulate sensors can detect particulates, for example, in particulate matter ($PM_1$), ($PM_{2.5}$), or ($PM_{10}$) range. Pollutant sensing and smoke sensing are valuable for the cooking instrument 200 because intense energy output from the heating elements 218 have the ability to not only sear food matter, but also burn the food matter. Depending on the desired outcome, the food matter may need to be seared without too much burning, or be strategically burnt in certain areas. The particulate sensing can feed valuable data to the computing device 206 to modulate the intensity and timing of the heating elements 218 to achieve the desirable outcome (e.g., cooked state of various foodstuff). The computing device 206 can also utilize the outputs of the environment sensors 246 as dynamic feedback to adjust the controls of the heating elements 218 in real-time according to a heating sequence instruction (e.g., a heat adjustment algorithm).

In some embodiments, the cooking instrument 200 includes the chamber thermometer 250, and/or the temperature probe 254. For example, the computing device 206 can utilize the temperature readings from the chamber thermometer 250 as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

Device Self Protection

In various embodiments, the cooking instrument 200 is capable of providing self-preservation functionalities. Unlike conventional cooking instruments that rely on user intervention for self-preservation, the computing device 206 can monitor various sensor signals to ensure that the heating system 216 does not accidentally place the cooking instrument 200 in one or more threat conditions. Conventionally, the responsibility of protecting the cooking instrument has always fell on the user. Traditional manufacturers generally make the assumption that no non-standard condition can possibly occur due to limitations it puts in its heating system. However, that may not be a safe assumption as many different external factors can be unforeseeable at the time of design and testing.

In one example, the computing device 206 can process signal feeds from the image sensor system 222, the microphone 244, the chamber thermometer 250, the temperature probe 254, the environment sensors 246, the input component 234, or any combination thereof, substantially in real-time, to identify threat conditions in the cooking instrument 200. In some cases, the computing device 206 can receive feedback from the heating elements 218 themselves, such as sensing that one of the filaments is no longer working. Threat conditions may pertain to overheating (e.g., as evidenced by raising temperature, visual of smoke, sound signal of sizzling fire or popping oil), electric shorts, or other unrecognizable patterns that deviates from the ordinary state of operation. For example, the computing device 206 can process the signal feed(s) to detect smoke beyond a threshold level, temperature beyond a threshold level, presence of fire, electric discharge over a threshold level, steam beyond a threshold level, or any combination thereof.

In one example scenario, foodstuff may be destined to be overcooked when too much wireless energy is pumped into the food. This can result in the region of lowest target temperature of the foodstuff (e.g., at the center of thickest portion of the foodstuff) to go higher than intended by the heating sequence. In these cases, the temperature probe 254 (e.g., a multi-point temperature probe) can detect that threat condition and reduce heating intensity until a calculated confidence indicating correct heat has been injected goes higher than a confidence threshold.

In another example scenario, failure of a heating element (e.g., when a filament breaks) is not evident to the user. By measuring the filament's resistance, the computing device 206 can ascertain its health. In another example scenario, a fire can burn within the cooking chamber. The image sensor system 222 can monitor the cooking chamber and monitor the generation of smoke. The computing device 206 can determine or identify the flashpoint of combustible food matter in the cooking chamber (e.g., by correlating the detected smoke to a measured temperature and/or a timestamp). The computing device 206 can use the flashpoint and the detected smoke to make probabilistic assessments as to the likelihood of fire. If likelihood of fire is high, the computing device 206 can back off the heating intensity of the heating system 216. If fire is detected in the cooking chamber, the heating system 216 can shut-down until fire extinguishes due to lack of oxygen. In the case that some smoke is detected, the computing device 206 can immediately back off heating, and apply a preprogrammed lower intensity heating patterns such that smoke is not generated with the same intensity. Alternatively, the computing device 206 can learn the best intensity of heat to apply. The vast majority of smoke is produced by pyrolysis, which is characterized by blackening of the food matter.

The computing device 206 can thus process the signal feeds to detect a threat condition in substantially real-time. Responsive to detecting the threat condition, the computing device 206 can command the other components of the cooking instrument 200 to take remedial action to counter the threat condition or send an alert to a user of the cooking instrument 200 via the output component 238, the display 230, the light source 242, the network interface 226, or any combination thereof. For example, the remedial action can be turning off the one or more of the heating elements 218 or changing the cooking mode of the heating elements 218 (e.g., stopping a searing mode that directly transfers heat to the surface of the foodstuff).

Detectable threat conditions can include a condition that would spoil the food quality of a final comestible produced by the cooking instrument 200. For example, the threat conditions can include: when the cooking instrument 200 is searing too rapidly (e.g., too much risk of blackening or burning) or when too much steam is condensing (e.g., indicative of brining too much water to boil, which may indicate dry food). Such conditions can be detectable via machine vision on the image sensor system 222, audio signal detection via the microphone 244, or the environment sensors 246. Detectable threat conditions can be stored as a system-wide setting in the persistent memory 214. In some embodiments, the detectable threat conditions include a condition that is correctable (e.g., the heating system 216 can be adjusted based on the detected threat condition to improve quality of the resulting comestible). In some embodiments, the detectable threat conditions include a condition that lowers the quality of the user experience in using the cooking instrument 200. For example, having a lot of smoke or condensing steam in a cooking chamber (e.g., the chamber 102) may interfere with the visual feedback provided by the display 230 or having a lot of popping noise in the cooking chamber may interfere with the audio feedback heard by the user.

When the computing device 206 executes a heating sequence to drive the heating system 216, the computing device 206 can detect, based on an output signal (e.g., an open-ended data stream) of a sensor (e.g., the image sensor system 222, the microphone 244, the input component 234, the temperature probe 254, the chamber thermometer 250, the environment sensor(s) 246, or any combination thereof), a trigger event. The computing device 206 can, responsive to detecting the trigger event, configure the heating system 216 to interrupt or reconfigure the heating sequence. In some cases, the computing device 206 can configure according to a branching condition specified by the heating sequence (e.g., the heating sequence includes multiple branches and a trigger condition corresponding to the trigger event that specifies a particular branch to take in response to the trigger event). In some cases, the computing device 206 can interrupt the heating sequence due to detecting a threat condition.

In some embodiments, the sensor is the microphone 244 and the computing device 206 detects the trigger event by monitoring a continuous audio stream to identify sound of popping, boiling, sizzling, or other sound patterns indicative of a change in phase or state of foodstuff in the cooking chamber. In some embodiments, the sensor is the environment sensor 246, particularly a volatile organic compound (VOC) sensor. The computing device 206 can detect the trigger event by performing a particulate analysis to identify specific aerial material associated with a change in phase or state of foodstuff in the cooking chamber. The computing device 206 can be further configured to perform an anisotropic reflectance and/or multi-wavelength analysis to facilitate identification of particles in the particulate analysis (e.g., by determining the particulate size).

An important component of dynamic cooking is being able to obtain feedback to the states of foodstuff within a cooking chamber. However, conventional grills and ovens at most provide a temperature signal. Some embodiments include utilizing image sensor feedback and machine vision to enable dynamic cooking. For example, if the computing device 206 determines that a surface of foodstuff is searing more quickly than intended according to an image taken by the image sensor system 222, the computing device 206 can shorten searing time of a heating sequence, stop searing, or reduce heat intensity. For another example, if the computing device 206 observes that foodstuff (e.g., steak or bread) contracts in girth/width and increases in height (or vice versa) as it transforms under heat, the computing device 206 can re-adjust the heating intensity according to whether the foodstuffs surface is closer or farther away from the heating elements 218.

Even cooking instruments with a camera lack the capability of precise identification of aerial molecules within the cooking chamber, where such identification of the molecules can shed light on the physical states and phase changes of foodstuff within the cooking chamber. Various embodiments advantageously utilize the microphone to capture an audio signal within the cooking chamber and analyze the audio signal to: (1) detect state changes in foodstuff (e.g., sizzling, popping, combustion, boiling, searing, and other characteristic sound patterns that occur at certain known temperatures etc.); and/or (2) detect threat conditions (e.g., fire and smoke). Various embodiments advantageously utilize the VOC sensor to determine the presence of particulates in the cooking chamber. A full particulate analysis including particulate size determination can help the control system better tailor the heating sequence for precision cooking.

Anisotropic reflectance is a measurement technique that attempts to gauge particulate geometry without 3-D scanning of tiny particles. Typical particles of interest range from less than 1 um to 10 um. Anisotropic reflectance works by using multiple incident lights (e.g., the light sources 242) and multiple receivers (e.g., the image sensor system 222) to assess possible asymmetries of the particle. For example, there can be two light transmitters A and B, and there are two light receivers C and D. If the particulate matter were perfectly spherical, reflections from light transmitter A to light receiver C, light transmitter A to light receiver D, light transmitter B to light receiver C, and light transmitter B to light receiver D should all be equivalent. If the particular were not spherical, these readings would be different, and some estimates to its geometric properties can be made.

Estimates to the particle size can be made in several ways. In some embodiments, the computing device 206 can time the length of a reflected pulse (e.g., time between activating at least one of the light sources 242 and time when the image sensor system 222 receives the light pulse), assuming all particles are traveling at the same speed. In some embodiments, the computing device 206 can use multiple wavelengths from the light sources 242 to assess the size of the particle. If the particle were substantially smaller than the wavelength of the illuminating light, the particle will be invisible to a corresponding light detector/light sensor. Specifically, to detect submicron particles, the computing device 206 can utilize a blue LED or a blue laser as one of the light sources 242. Such a submicron particle would not be visible to an infrared LED or infrared laser.

Characterizing the smoke particles or just generally characterizing size and composition of particles using in anisotropic reflectance enables the computing device 206 to discern different types of particulates in the air. For example, if visible water vapor is detected, it means that the surface of the food matter has exceeded 100° C. and that vaporization of water is happening. This can be a particular trigger condition in a heating sequence executed by the computing device 206. The heating sequence can be adjusted to account for the fact that the food matter would lose moisture relatively quickly responsive to detecting this trigger condition. The setting of the image sensor system 222 can remain the same in some cases as this type of water vapor would also not likely to bother the user of the cooking instrument 200.

During the searing phase of certain proteins, the particulates that are emitted have a certain unique signature in the form of ratios between different particulate characteristics. It can be valuable to a dynamic heating sequence executed by the computing device 206 to determine exactly when searing has started and when it has stopped. The quantity of smoke generated during this phase can be directly proportional to user irritation since smoke is usually undesirable. In some embodiments, the computing device 206 can control the heating elements 218 to minimize the amount of smoke emitted during searing using the smoke detection as feedback.

Burning food matter is frequently undesirable for culinary reasons. Burning food matter generates a large amount of smokes/particulates. Detection of a large amount of smoke would allow the computing device 206 to considerably reduce heating intensity at the expense of cooking speed in order to make the cooking process more amicable.

Light Normalization for Camera

A camera inside a cooking chamber may produce insufficiently illuminated images, especially when the cooking chamber is fully enclosed. Cameras produce better images when illuminated by white light (e.g., having at least multi-spectral content in red, green, and blue or adjacent wavelengths thereof). Illumination by balanced multi-spectral content (as to mono-spectral or unbalanced multi-spectral light) can give the user a nicer image to review or share. The computing device 206 may also be post-processing images to normalize to the same scale, allowing easier tracking of features and detection of threats. In such cases, balanced multi-spectral content would negatively affect the normalization to produce inaccurate highlighting of features or threat conditions. Some embodiments leverage the existing heating elements 218 as light sources for the image sensor system 222. In some embodiments, the heating elements 218 are infrared heaters, and hence produce electromagnetic waves in infrared, near infrared, and/or red leaning spectra. Some embodiments utilize both the light source 242 and the heating elements 218 as a lighting system. Some embodiments utilize just the light source 242 as a lighting system.

The images produced from the image sensor system 222 when illuminated by the heating elements 218 can lean toward a certain color (e.g., be red leaning for infrared-based heating elements). In some cases, the image sensor system 222 may include an automatic white-balancing and gain control post-processor. The postprocessor may assume a white balanced light source, and may further distort the white balance, brightness, and/or contrast of the captured images. Particularly, white balancing generally does not work with a heater as a source of illumination because the heater changes brightness and wavelengths (optical wavelengths) too quickly for the white-balancer in the image sensor system 222 to work. Sometimes white balancing is not possible when illuminated with substantially red leaning light settings because the blue pixels in a typical camera would not contain enough information. To mitigate this problem, long wave suppressing filter can be implemented to "balance" the subpixel illumination so that RGB all contains data above their noise floor. A long wave suppressing filter can simply be a filter with blue tint, which suppresses red and green. It could also be a filter that removes red and infrared.

To remedy the potential technical issues described above, in various embodiments, the computing device 206 is configured to further process the images produced from the image sensor system 222 when illuminated by the heating elements 218 to undo the distortions produced from the postprocessor of the image sensor system 222. By further processing and filtering the images captured from the image sensor system 222, the computing device 222 can generate images representative of the foodstuff inside a cooking chamber with a proper brightness level, contrast, white balance, or any combination thereof.

The computing device 206 can coordinate and execute a heating sequence utilizing the heating elements 218. The heating sequence can adjust wavelengths and intensities of one or more of the heating elements 218 simultaneously in sync with the image sensor system 222's exposure window (e.g., including the timing and duration of the exposure). The heating sequence can synchronize the heating elements 218 with the exposure window as well as proactively control white-balancing. For example, the heating sequence can set one or more of the heating elements 218 to emit electromagnetic radiation with color temperature to match the image sensor system 222's white-balancer's color temperature to settle at the same point together such that the heating elements 218 are usable as an illumination source when taking images with the image sensor system 222. The computing device 206 can also enhance an image from the image sensor system 222 by combining multiple exposures (e.g., utilizing high dynamic range imaging). The computing device 206 can also background subtract an image, detect differences between an image and a previously taken image of the same foodstuff, or beautify an image in various ways (e.g., blurring out image background, adjusting depth of focus, adjusting target of focus, etc.).

Camera Feed Standardization and Beautification

Modern day technology needs to tailor to modern day culture. Live action filming (e.g., taking video or photo of a person performing a task, particular a skill based task) is a recent cultural phenomenon. In the realm of live cooking photography, only open space cooking, such as grill top cooking, enables live action filming/photography. To foster human being's nature behavior to show case one's ability, various embodiments provide methods of performing live cooking photography even though foodstuff is being made within a configurable cooking instrument. Various embodiments include storing imaging settings to highlight foodstuff transformation in the persistent memory 214 to standardize the proper moment, zoom, crop/framing, exposure, aperture, shuttle speed, or other camera settings to snap a photo of cooking in action. In some embodiments, the imaging settings can be regardless of foodstuff types and/or regardless of foodstuff amount. In some embodiments, the imaging settings can be specific to a foodstuff type and/or a foodstuff amount. Accordingly, the cooking instrument 200 advantageously enables digital social interactions around the act of cooking.

Utilizing the image sensor system 222 within the cooking instrument 200, the computing device 206 can take picture or video of foodstuff in the chamber 202 while a heating sequence is being executed in action. Sometimes, due to the limited space, limited opportunity, possible interference and limited lighting, photos and videos do not turn out so well. In these cases, the computing device 206 can utilize its signal feeds (e.g., one or more signal feeds from the image sensor system 222, the microphone 244, the input component 234, the chamber thermometer 250, the temperature probe 254, the environment sensor(s) 246, or any combination thereof) to choose the right moment to instruct the image sensor system 222 to snap a photo. The computing device 206 can also synchronize the capturing of image(s) by the image sensor system 222 with the heating elements 218 and/or the light source 242 to generate the right condition to snap the best or substantially best image/video. In some embodiments, the computing device can post-process the captured images or videos according to a methodology corresponding to the internal environment (e.g., as dynamically determined from the signal feeds) specific to the cooking instrument 200.

The right moment to snap a picture can be adjustable based on preset parameters. In some embodiments, no additional dedicated interior light is present in the cooking chamber, hence saving valuable material and labor cost of constructing the cooking instrument 200. A relatively low color temperature (e.g., longer wavelength) illumination target can be picked as the ideal setting for snapping the picture. While the lower color temperature illumination target results in relatively inferior white balancing and picture quality, it has the positive quality of being able to achieve target illumination quickly from an un-illuminated heating element. This means it is relatively easy to achieve the right illumination within fractions of a second, allowing the image update rate to be considerably quicker. Additionally, the direct transfer of energy is considerably less intense in longer wavelengths, making the activation of the heating element as an illumination source more suitable as it causes less unwanted cooking.

Machine Vision

The computing device 206 can execute a heating sequence to drive the heating system. In some cases, the heating sequence includes an instruction to adjust a spectral power distribution of the emitted wireless energy based on a trigger event. The computing device 206 can then detect, based on an image of the foodstuff from the image sensor system 222 (e.g., a camera, an array of optical sensors, and/or one or more monochromatic light sensors), the trigger event specified by the heating sequence or a system-wide threat condition setting. The trigger event can be a user-specified or system-specified searing level. The trigger event can be a smoke presence level. The trigger event can be a fire presence level. The computing device 206 can detect the searing level, the smoke presence level, and/or the fire presence level by running an image from the image sensor system 222 through a computer model (e.g., a machine learning model, such as a deep learning/neural network model). Responsive to detecting the trigger event, the computing device 206 can configure the heating system 216 to adjust the spectral power distribution or emission intensity of the emitted wireless energy from the tunable heating element.

The computing device 206 can utilize machine vision and positioning of a known visual marker within the cooking chamber to facilitate detection of relative location of at least a portion of the foodstuff. In marker-based machine vision, the computing device 206 possesses the digital representation of the image to recognize beforehand. Instead of having to analyze a photograph and its many spatial characteristics to determine positions of potential objects, the computing device 206 can just match the image of the known visual marker within the photograph. The visual marker can be placed within the cooking chamber (e.g., on an interior surface of the cooking chamber, the cooking platform 110, and/or a meal kit package placed into the cooking chamber by a user). The marker can be integral with, affixed to, or removably attachable to the interior surface of the cooking chamber. The marker can be integral with, affixed to, or removably attachable to the cooking platform 110. The marker can be integral with, affixed to, or removably attachable to a packaging of a meal kit that contains the foodstuff. The marker can be a cutout, a bevel, an etch, a coating, a material/composition difference, or any other visually detectable feature or pattern.

Structure Light Imaging

The computing device 206 can utilize structured light to identify the objects within the cooking chamber. Structured light is the process of projecting a known pattern (e.g., grids or horizontal bars) on to a scene. The way that these known patterns deform when striking surfaces within the cooking chamber enables the computing device 206 to deploy a vision system to calculate the depth and surface information of the objects in the scene.

For a given level of power emitted by the heating elements 218, the level of power applied onto food matter changes as a function of distance from the heating elements 218 as well as the food matter's thermal sinking properties. For example, when searing a surface of the food matter, knowing the surface information enables the computing device 206 to throttle up or down the heating system 216 to achieve the sear objective. Knowing geometric shape information such as height and approximate volume enables the computing device 206 to adjust heat to avoid burning, over-searing or under-searing the food matter or to guide the food matter to the right doneness.

In one example, food matter A can have huge volume and food matter B can have a tiny volume. If intense heat is applied on food matter B the same way as food matter A, food matter B can be "predestined to overcook" because the heat wave would travel into the food's interior and overcook it even if heat is no longer applied. Once predestined to overcook, it is difficult to avoid overcooking short of cooling the interior of food somehow. This is an example where the surface information of the food matter can be useful in avoiding and preventing such overcooking scenario to become predestined.

Hyperspectral Imaging

The image sensor system 222 can be configured to be sensitive to a specific wavelength. The image sensor system 222 can contain one or more sensors, each sensitive to a specific wavelength, a specific range of wavelengths, or multiple wavelengths. The computing device 206 can be configured to generate a hyperspectral response image based on an output image of the image sensor system 222. The specific wavelength can correspond to an output wavelength of one of the heating elements 218. In some examples, the light source 242 is a monochromatic light source. The monochromatic light source can be a light source capable of only producing a specific monochromatic light or a color tunable light source that can be reconfigured to produce different monochromatic light. The specific wavelength can correspond to an output wavelength of the monochromatic light source.

The computing device 206 can be configured to determine, based on the hyperspectral response image, a foodstuff attribute. The foodstuff attribute can be a trigger condition to configure a heating sequence. The foodstuff attribute can include composition of the foodstuff, spatial dimension of the foodstuff, material of the foodstuff, cooked state of the foodstuff, phase of the foodstuff, or any combination thereof. The computing device 206 can be configured to synchronize the heating system 216 with the image sensor system 222 such that an exposure window of the image sensor system 222 corresponds to when the heating system 216 is off or when the heating system 216 is substantially consistently producing electromagnetic waves at a specific wavelength. The heating system 216 can be configured to emit electromagnetic waves from one of the heating elements 218 at a color temperature that matches a color temperature configuration of a white-balancer of the image sensor system 222.

Figure 7:
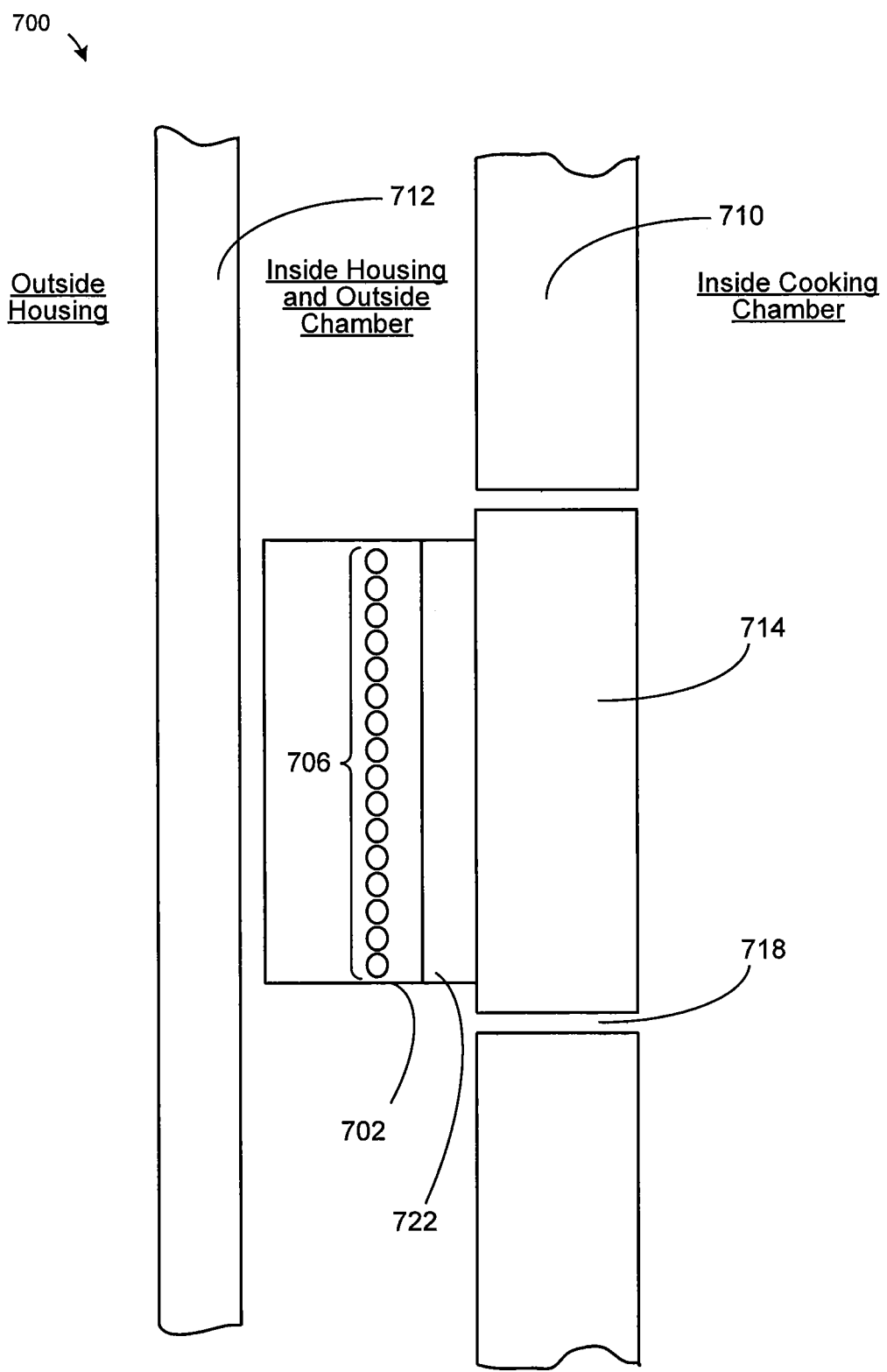
FIG. 7 is a partial cross-sectional diagram of a cooking instrument including an image sensor system, in accordance with various embodiments.

FIG. 7 is a partial cross-sectional diagram of a cooking instrument 700 (e.g., the cooking instrument 100 or the cooking instrument 200) including an image sensor system 702, in accordance with various embodiments. The image sensor system 702 can include a plurality of light sensors 706 (e.g., in a pattern of an array or a matrix). In some embodiments, the plurality of light sensors 706 are grouped into sets, each light sensor of each set sensitive to a different optical spectrum.

The cooking instrument 700 can include a partially enclosed cooking chamber 710, which can be in turn enclosed by a housing 712. The cooking chamber 710 can include a chamber window 714 embedded therein. In some embodiments, the image sensor system 702 is attached directly to the cooking chamber 710. In some embodiments, the image sensor system 702 is spaced apart from the cooking chamber 710 (not shown).

In some embodiments, the cooking chamber 710 can also include an anti-condensation structure 718, which includes one or more channels or slits that exposes the interior of the cooking chamber 710 to an exterior of the cooking chamber 710 and thereby enables air to flow therebetween. For clarity, the chamber window 714 has been illustrated in FIG. 7 to appear as floating, but it can be attached to the cooking chamber 710 along a plane perpendicular to a plane intersecting the anti-condensation structure 718 (not shown). The chamber window 714 can protect the image sensor system 702 from vapor and debris (e.g., grease, stray foodstuff, or oil) coming from within the cooking chamber 710. The anti-condensation structure 718 can include an opening in the cooking chamber 710 immediately adjacent to the chamber window 714 to change the local dew point. The relatively small leakage in internal chamber air is a detriment to regular ovens, but it is significantly less impactful for an optical cooking instrument (e.g., an infrared-based oven as described in various embodiments) where direct-transfer to power is used more often.

The image sensor system 702 can include an optics 722 over the plurality of light sensors 706. In some embodiments, the optics 722 has an oleophobic coating. In some embodiments, the chamber window 714 has an oleophobic coating. In some embodiments, the chamber window 714 and the optics 722 have oleophobic coatings. Because the image sensor system 702 is placed inside the cooking chamber 710, the chamber window 714 can easily get coated with debris from the foodstuff. The oleophobic coating can prevent disruption of the optical path. The existence of the anti-condensation structure 718 may allow some debris to get to the optics 722, and hence the olelophobic coating on the optics 722 can help reduce optical blockage.

The optics 722 can also include a color filter. The color filter can be adapted to even out spectra of optical light traveling toward the light sensors 706. In some embodiments, the color filter is a red cut filter (cutting out red light). In some embodiments, the color filter is a blue light filter (letting only blue light through). The color filter can be used to rebalance the spectral distribution of images taken by the image sensor system 702 when images are taken using infrared heater light. The color filter can be adapted to remove spectral content corresponding to a particular wavelength or wavelength range from optical light within the cooking chamber traveling toward the image sensor system 702 (e.g., where the wireless electromagnetic energy emitted by the heating elements of the cooking instrument 700 leans toward the particular wavelength or the particular wavelength range).

Searing from Bottom

In some embodiments, the computing device 206 is configured to execute a heating sequence that includes a foodstuff searing sequence. The foodstuff searing sequence can be configured to drive the heating system 216 to sear a bottom surface of the foodstuff interfacing with a cooking platform (e.g., the cooking platform 110). The cooking platform can be a glass tray that enables infrared electromagnetic waves to pass-through. The foodstuff searing sequence configures the heating system 216 to emit electromagnetic waves at a specific wavelength that substantially passes through the cooking platform and cooks the bottom surface of the foodstuff while substantially not penetrating through a top surface of the foodstuff (e.g., electromagnetic waves at the specific wavelength can penetrate low-density protein and fat). The foodstuff searing sequence can be configured to drive the heating system 216 to emit electromagnetic waves at a specific wavelength that substantially passes through the cooking platform and cooks the bottom surface of the foodstuff while substantially not penetrating beyond the bottom surface of the foodstuff (e.g., electromagnetic waves the specific wavelength cannot substantially penetrate protein and hence does not directly heat food, particularly meat, beyond just the bottom surface).

Conventional methods of searing include indirect searing by heating a pan that indirectly sears food or by directly searing from a top surface (e.g., away from a cooking platform) of the food using a torch. In the case of conventional direct searing, the exposed top side has no support, and hence the edible substance would curl as it is seared, resulting in inconsistent searing. Heating from the bottom side of the cooking platform advantageously enables the computing device 206 to safely assume a fixed distance between the intended sear surface and the heating elements. That is, the cooking instrument 200 does not need to know the thickness of the target foodstuff. Weight of the foodstuff also creates a downward pressure that forces the foodstuff to be flat against surface, and therefore no curling of the foodstuff. This particular setup advantageously prevents camera from getting splattered while foodstuff is searing (cooking platform and weight of foodstuff holds potential pop off in place). This particular setup also enables direct heat transfer using an infrared based heating system (e.g., the heating system 216). This setup is enabled because the cooking platform can be optically clear such that the bottom surface of the target foodstuff is reachable by the wireless energy of the heating system 216 and dynamic computer vision-based feedback cooking can be done by monitoring the searing progress through the optically clear cooking platform.

Example Implementations

In some example implementations, the heating system 216 includes at least a tunable heating element (e.g., one of the heating elements 218) capable of emitting wireless energy into a cooking chamber (e.g., the cooking chamber 102). To start a process of cooking food, the computing device 206 (e.g., the control system of the cooking instrument 200) can first determine (e.g., identify, select, or infer) a food substance or a food cooking recipe. For example, the computing device 206 can determine the food substance as being in the cooking chamber or intended to be in the cooking chamber. The determination of the food substance can be by image recognition (e.g., using data captured by the image sensor system 222), user input (e.g., using data from the network interface 226 and/or from the input component 234), voice recognition (e.g., using data captured by from a microphone 244), or any combination thereof.

The computing device 206 can be configured to generate, based on an identity of the food substance or the food cooking recipe, a heating sequence to drive the heating system 216. For example, the heating sequence includes or references parameters to determine how to provide power to the tunable heating element to cause the tunable heating element to emit according to a target spectral power distribution. When generating the heating sequence, the target spectral power distribution can be selected to match the absorption spectrum of the food substance or an intermediary cooking medium (e.g., air, cooking platform/tray, water surrounding the food substance, etc.) for cooking the food substance.

In some cases, the computing device 206 can select the food cooking recipe based on identification of food substance by the computing device 206. In some cases, the computing device 206 can infer an expectation of a certain type of food substance to be cooked, in response to receiving a user selection of the food cooking recipe. In some cases, the computing device 206 is configured to generate the heating sequence neither with the identification of food substance nor with an inferred expectation of what food substance is expected to be cooked.

The computing device 206 can be configured to detect trigger events dictated by or specified in one or more heating sequences of one or more food cooking recipes. For example, the logics of the heating sequence can include an instruction to adjust a spectral power distribution of the wireless energy emitted from the tunable heating element in response to the computing device 206 detecting a particular trigger event. After the heating sequence is initiated, the computing device 206 starts to monitor for the detection of the trigger event. In response to detecting the trigger event, the computing device 206 can configure the heating system to adjust the spectral power distribution of the emitted wireless energy from the tunable heating element. In some embodiments, the heating sequence includes an instruction to simultaneously adjust, based on a trigger event detectable by the computing device 206, a plurality of spectral power distributions of wireless waves emitted respectively from the multiple heating elements 218 in the heating system 216. In some cases, the instruction can specify a target spectral power distribution as corresponding to one of the trigger event. In some cases, the instruction can specify a target object category (e.g., defined by foodstuff shape, foodstuff size, foodstuff material, or any combination thereof) associated with the target spectral power distribution as corresponding to one of the trigger event.

In some embodiments, the persistent memory 214 stores a logic function or a database (e.g., a lookup table) that associates target object categories (e.g., defined by material, size, shape, etc.) respectively with wavelength-specific configurations (e.g., each wavelength-specific configuration associated with a target spectral power distribution and/or how to adjust the spectral power distribution to the target spectral power distribution). Instructions in a heating sequence can reference the logic function or the database to identify a wavelength-specific configuration associated with a target spectral power distribution. A wavelength-specific configuration can be associated with a set of one or more parameters that configure the computing device 206 to send a control signal to the heating system 216. The control signal can correspond to characteristics indicative of a target spectral power distribution of waves emitted from the tunable heating element.

A wavelength-specific configuration can be associated with one or more absorbent wavelengths, transmissive wavelengths, or reflective wavelengths of one or more materials in or that are part of the cooking chamber. For example, the materials can include food, glass, metal, air, or any combination thereof. The computing device 206 can be configured to determine that a target foodstuff category (e.g., user-specified, recipe-specified, or image-sensor-identified) or a target intermediary cooking medium is in a target object category and drive the tunable heating element according to the wavelength-specific configuration associated with the target object category according to the database in the persistent memory 214. In some embodiments, the absorptivity characteristic of the target object category allows for multiple wavelength-specific configurations. In those embodiments, a single wavelength-specific configuration can be selected by the computing device 206 to optimize for available power density (e.g., cooking speed) based on the absorptivity band(s) of the target object category.

In some embodiments, aside from adjusting the spectral power distribution, the heating sequence can also include instructions to adjust the intensity, duration, pulse pattern, or any combination thereof, of the wireless energy emitted from the tunable heating element. Execution of the instruction can be dynamic or sequentially timed. That is, the trigger event can be a time-based event, a user indicated event, or a sensor data indicated event.

In various embodiments, the spectral power distribution of waves emitted from a tunable heating element is adjusted by modulating power provided to the tunable heating element to tune the temperature of the tunable heating element to a particular range. In some embodiments, the power supply 202 is adapted to supply electrical power to the tunable heating element according to instructions from the computing device 206. The power supply 202 can draw power from an AC wall outlet. For example, the power supply 202 can include an AC power plug adapted to connect with the wall outlet. In some embodiments, the power supply 202 provides pulse modulated electrical power to the tunable heating element. For example, the pulse modulated electrical power can be modulated DC power or rectified half-cycle AC power.

In some cases, the computing device 206 can adjust the spectral power distribution of the tunable heating element by adjusting a duration that the power supply 202 is supplying power to the tunable heating element. For example, the persistent memory 214 can store a driver parameter. The driver parameter can be associated with a target spectral power distribution or at least a characteristic thereof. The driver parameter can be correlated with a variation of the spectral power distribution as a function of time that the tunable heating element is continuous turned on without a substantial pause (e.g., duration of what constitute "substantial pause" can be stored as a parameter as well). The computing device 206 can adjust the duration based on the driver parameter and the known time that the tunable heating element has been continuously turned on. Alternatively, the driver parameter can be correlated with variation to the spectral power distribution as a function of an operational core temperature of the tunable heating element. The computing device 206 can adjust the duration based on the driver parameter and the known operational core temperature of the tunable heating element. The function represented by the driver parameter advantageously enables the computing device 206 to tune the spectral power distribution emitted from a single heating element. The amount of time that the tunable heating element has been continuously turned on is an estimator of operating core temperature of the tunable heating element because temperature increases over time whenever a tunable heating element is connected to electrical power up until equilibrium temperature is reached. Equilibrium is when temperature dissipation is substantially equal and opposite to temperature increase.

In some embodiments, the power supply 202 includes a power control mechanism capable of switching power on or off to the tunable heating element. In some embodiments, the power control mechanism is a binary power switch. In some embodiments, the power control mechanism provides more than two states of power connections, such as an off state, a maximum power state, and one or more reduced power states. In these embodiments, the computing device 206 is configured to adjust the spectral power distribution of the tunable heating element to a target spectral power distribution by pulse modulating using the power control mechanism (e.g., according to a control signal from the control system to the power control mechanism). For example, the computing device 206 can pulse modulate the power control mechanism until a target core temperature of the tunable heating element is reached. The persistent memory 214 can store an association between the target spectral power distribution and the target core temperature such that the computing device 206 can determine that they correspond to each other during operation of the heating system 216. The persistent memory 214 can store an association between a pulse modulation configuration (e.g., pulse frequency, pulse width/duty cycle, pulse intensity, or any combination thereof) and a target spectral power distribution.

The computing device 206 can be configured to slow (e.g., decrease in frequency) the pulse modulating of the power control mechanism when an estimated operational temperature of the tunable heating element is above a threshold temperature, when the power control mechanism has been in a particular state for more than a threshold duration, and/or when the power control mechanism has been in a particular state for more than a threshold amount in a preset duration. The particular state can be either an "on" state or an "off state". The slowing of the pulse modulation can include stopping the pulse modulation. Threshold amount can be measured as a fraction or a percentage within preset duration that the power control mechanism is in the particular state. Similar to the mechanism of slowing, the computing device 206 can be configured to speed up (e.g., decrease in frequency) the pulse modulating of the power control mechanism when an estimated operational temperature of the tunable heating element is below a threshold temperature, when the power control mechanism has been in a particular state for less than a threshold duration, and/or when the power control mechanism has been in a particular state for less than a threshold amount in a preset duration.

Figure 3:
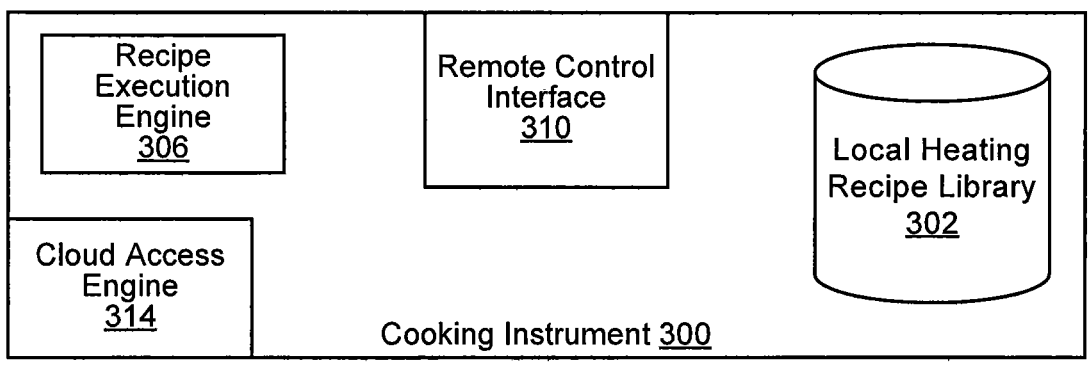
FIG. 3 is a block diagram illustrating functional components of a cooking instrument, in accordance with various embodiments.

FIG. 3 is a block diagram illustrating functional components of a cooking instrument 300 (e.g., the cooking instrument 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof. The cooking recipe library 302 stores one or more cooking recipes, each cooking recipe including one or more heating sequences respectively for one or more portions of food. The recipe execution engine 306 interprets the executable instructions from the cooking recipes and its heating sequences. The remote control interface 310 enables the functional components of the cooking instrument 300 to be controlled by an external user device (not shown). The remote control interface 310 can enable the external user device to configure the functional components of the cooking instrument 300 or to request information from the external user device. For example, the remote control interface 310 can connect with the external user device via the network interface 226. The cloud access engine 314 enables the cooking instrument 300 to communicate with a backend server system (not shown) to configure the functional components of the cooking instrument 300 or to request information from the backend server system.

In some examples, the recipe execution engine 306 can load and interpret a set of instructions to implement a cooking recipe, including executing a heating sequence (e.g., a dynamic segments, static segments, or any combination thereof). For example, the recipe execution engine 306 can analyze an image from a camera (e.g., the image sensor system 222) to determine whether a door (e.g., the door 106) is open. For example, the image from the camera may be illuminated by a specific color of a specific light source (e.g., the light source 242) when facing toward an interior of the cooking instrument 300. In some examples, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In this example, the remote control interface 310 is configured to send a message to an external user device to confirm the automatically selected cooking recipe. In some examples, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating sequence in accordance of the cooking recipe by controlling the heating elements. The heat adjustment algorithm is capable of dynamically controlling the heating elements 218 (e.g., adjusting output power, spectral power distribution, and/or peak wavelength(s)) in real-time in response to changing input variables (e.g., real-time sensor inputs, user inputs, external user device or backend server system provided parameters, or any combination thereof).

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application running on the user device. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe and/or update the cooking recipes in the cooking recipe library 302.

Components (e.g., physical or functional) associated with the cooking instrument (e.g., the cooking instrument 100, the cooking instrument 200, and/or the cooking instrument 300) can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
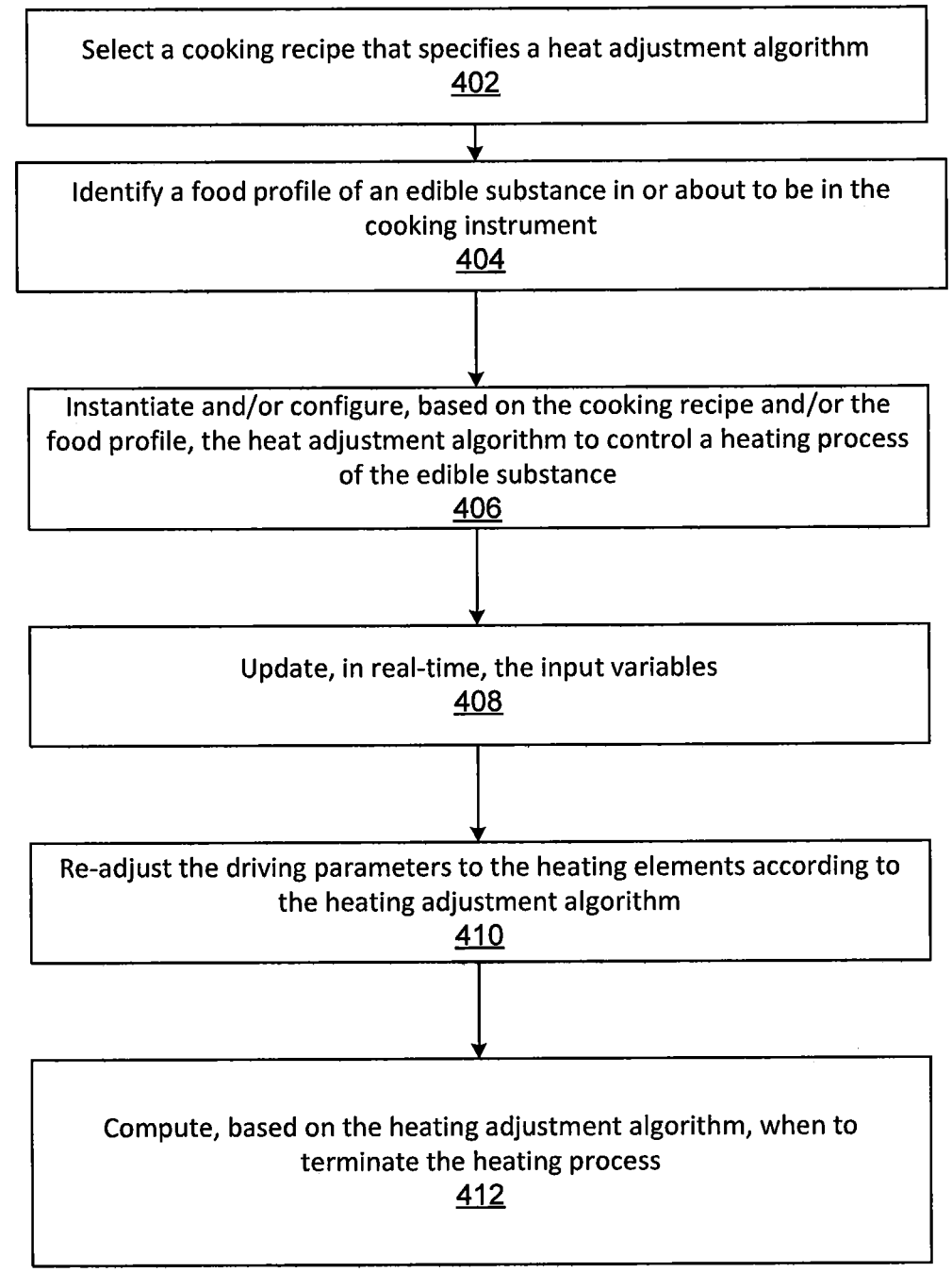
FIG. 4 is a flowchart illustrating a method of operating a cooking instrument to cook food, in accordance with various embodiments.

FIG. 4 is a flowchart illustrating a method 400 of operating the cooking instrument (e.g., the cooking instrument 100, the cooking instrument 200, and/or the cooking instrument 300) to cook food, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking instrument, in an external cooking recipe library implemented by a cloud service accessible through a network interface (e.g., the network interface 226), or in the memory of another external source connected to the computing device). Optionally, at step 404, the computing device can identify a food profile in or about to be in the cooking instrument. For example, the computing device can utilize a camera to identify the food profile (e.g., performing image recognition of the food, receiving user input, or scanning a digital label attached to an outer package of the food). The food profile can identify the type of food, the size of the food, the weight of the food, the shape of the food, the current temperature of the food, or any combination thereof.

At step 406, the computing device can instantiate and/or configure, based on the cooking recipe and/or the food profile, a heating sequence to control a heating system for cooking the food. The heating sequence can include one or more dynamic segments defined by a heat adjustment algorithm. The heat adjustment algorithm can specify how to adjust the driving parameters of one or more heating elements in the cooking instrument based on input variables that may change over time. Input variables can include time lapsed (e.g., time from when the heating elements are first driven and/or when the heating sequence first begins), temperature (e.g., detected by a temperature sensor in the cooking chamber or on the cooking platform) within the cooking instrument, user input (e.g., via an external device connected to the computing device or a control panel of the cooking instrument), temperature within the food (e.g., as reported by a temperature probe inserted into the food and communicatively coupled to the computing device), real-time or asynchronous image analysis of the food, real-time or asynchronous audio signal analysis from a microphone inside or outside of the cooking instrument, real-time or asynchronous environment sensor output analysis, other data received over a network, other data generated by a component of the cooking instrument, or any combination thereof. At step 408, the computing device can update, in real-time, the input variables and, at step 410, re-adjust the driving parameters to the heating elements of the heating system according to the heating sequence and/or the heat adjustment algorithm.

Part of the adjustment made by the heating sequence can include heat intensity, spectral power distribution and/or peak wavelength (e.g., for targeting different food or material within the cooking chamber), heat duration, target zone or cooking platform for heating, or any combination thereof. The computing device can configure the heating elements to apply different heating patterns to different zones (on the same cooking platform or different cooking platforms) in the cooking instrument. Each "zone" can be represented by an areas on a cooking platform or a portion of food resting on the cooking platform. The computing device can configure the heating elements to apply, simultaneously or sequentially, different heating patterns to different zones on the cooking platform by supplying different amount of power and/or emission spectral power distributions to different heating elements. The computing device can configure the heating elements to apply different heating patterns to different zones on the cooking platform by driving the heating elements of the heating system at varying peak wavelengths. The cooking instrument can include a perforated metallic sheet between the cooking platform and at least one of the heating elements. The computing device can configure the heating elements to apply different heating patterns to different zones on the cooking platform by using the perforated metallic sheet to spatially block portions of waves emitted by the at least one of the heating elements.

At step 412, the computing device can compute, based on at least an instruction in the heating sequence, when to terminate the heating sequence (e.g., when the cooking instrument stops supplying power to the heating elements). In some embodiments, the heating adjustment algorithm takes into account whether the food is expected to be extracted out of the cooking instrument and cut into relatively quickly after the termination of the heating process in order to achieve the desired level of doneness (e.g., a high-speed mode), the food may be cut into at any time during a relatively long duration after the termination of the heating process and still have the desired level of doneness (e.g., a low stress mode).

Figure 5A:
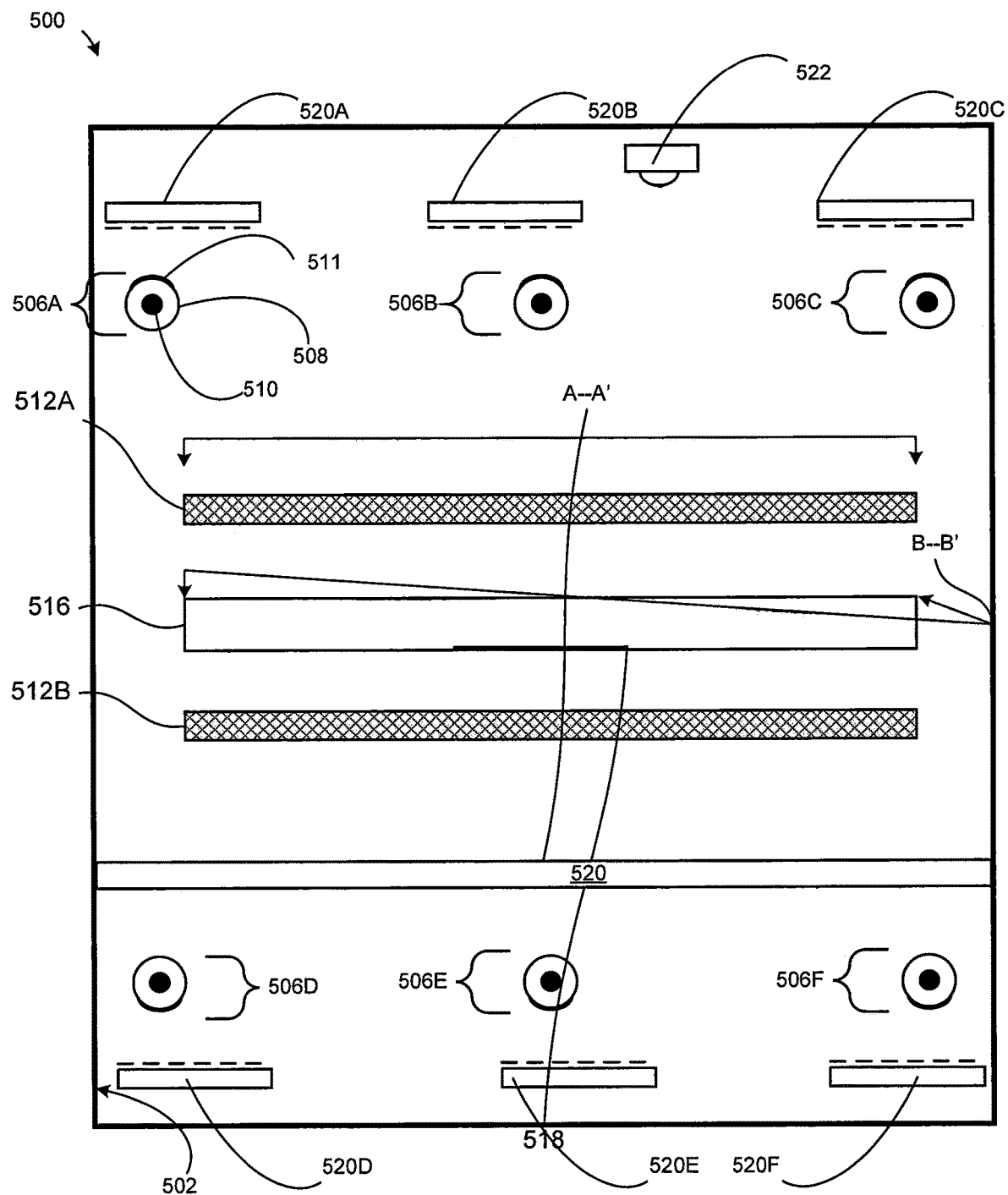
FIG. 5A is a cross-sectional front view of a first example of a cooking instrument, in accordance with various embodiments.

FIG. 5A is a cross-sectional front view of a first example of a cooking instrument 500 (e.g., the cooking instrument 100, the cooking instrument 200, and/or the cooking instrument 300), in accordance with various embodiments. The cooking instrument 500 includes a chamber 502 and a heating system (not labeled in FIG. 5A) with one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at one or more locations in the chamber 502. The filament assemblies 506 can respectively be part of the heating elements of the cooking instrument 500. Each of the filament assemblies 506 can include a containment vessel 508 surrounding a filament 510.

The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of each of filament assemblies 506 or the containment vessel 508 that faces away from a cooking platform 516. In some embodiments, the reflector 511 is a separate component than each of the filament assemblies 506 and the containment vessel 508. For example, each of the reflector 511 can be positioned adjacent to each of the filament assemblies 506 away from the center of the cooking chamber. In some embodiments, the reflector 511 is placed close enough to each of the filament assemblies 506 such that during normal operations (e.g., approximately 450 Fahrenheit or above), debris is burnt off between the corresponding reflector 511 and each of the filament assemblies 506. In some embodiments, at least one of the filament assemblies 506 is between the reflector 511 and a glass covering. In some embodiments, a glass covering is between at least one of the filament assemblies 506 and the reflector 511.

In some embodiments, the containment vessel 508 does not need a reflector. In some embodiments, the reflector 511 can be external to the containment vessel 508. Anti-fouling can be achieved by choosing a distance between the reflector 511 (e.g., in the case that it is external to the containment vessel 508) and the containment vessel 508 such that undesirable materials are burnt off the reflector 511 and/or the containment vessel 508. In some embodiments, the reflector 511 and/or the containment vessel 508 can be shielded from debris directly using another (transparent) material. In some embodiments, the filament assemblies 506 each has an end cap made of ceramic substance. The filament 510 can be wound to dramatically increase total length of filament without increasing the length of the filament assembly. The filament 510 can be wound uniformly or non-uniformly. Ends of the filament 510 can be sealed with molybdenum foil while maintaining electrical conductivity. The filament 510 can be wound with varying diameter or uniform diameter.

FIG. 5I) is an example cross-section of one of the filament assemblies 506, in accordance with various embodiments. In this example, the filament assembly 506A includes the containment vessel 508 surrounding the filament 510. The filament assembly 506A can include an end cap 513 (e.g., of ceramic substance). The filament 510 can be wounded. The filament assembly 506A can have reflector 511 external to and surrounding the containment vessel 508. In some embodiments, the reflector 511 can be attached to the end cap 513. In some embodiments, the reflector 511 is not attached to the end cap 513 (not shown).

A computing device (e.g., the computing device 206) can be configured to control the emission spectral power distribution (e.g., including one or more peak emission wavelengths) of the filament assemblies 506, individually, in subsets, or as a whole. For example, the computing device can be configured to identify a food profile associated with food (e.g., in the chamber 502) based on sensor input (e.g., camera scanning a label) and/or the user input. The computing device can then determine one or more excitable wavelengths associated with the food profile. For example, the excitable wavelengths can correspond to resonant frequencies of the food material(s) associated with the food profile. The computing device can drive one or more (e.g., a single assembly up to all) of the filament assemblies 506 to emit at a peak emission wavelength corresponding to at least one of the excitable wavelengths to heat the food.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g—a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the cooking platform 516 or below the cooking platform 516). In some embodiments, there are two perforated metal sheets (as shown). Each of the perforated metal sheets 512 can be a removable or fixated panel. The perforated metal sheets 512 can enable control of heating concentration along a horizontal plane parallel its surface. Perforated metal sheets, such as a perforated aluminum foil, can be used to shield certain food items from the intense radiant heat generated by the filament assemblies 506. For example, when cooking a steak and vegetables side-by-side, the perforated metal sheets can shield the vegetables from being overcooked and enable the steak to receive the full power from the filament assemblies 506. Longer wavelength emission from the filament assemblies 506 can penetrate perforations more equally compared to shorter wavelength. Hence even if the perforations were designed to shield, for example, 90% of direct radiant heat, the cooking instrument can still independently tune the spatial concentration of the heating by varying the wavelength. This enables some control of side-by-side cooking in addition to heating via direct energy transfer.

In some embodiments, the filament assemblies 506 are adapted to emit directional electromagnetic waves. Directionality of the emitted waves can enabled by the shape and/or location of the reflector 511, the structure, shape, and/or location of the containment vessel 508, the structure and/or shape of the filament 510, or any combination thereof. In some embodiments, the perforated metal sheets 512 further restricts the spatial concentration of the emitted waves. In some embodiments, at least some of the filament assemblies 506 are adapted to emit unidirectional electromagnetic waves.

In some embodiments, the chamber 502 includes the cooking platform 516 (e.g., the cooking platform 110) in the chamber 502. In some embodiments, the cooking platform 516 includes or is part of at least one of the one or more perforated metal sheets 512. The computing device can be configured to drive the filament assemblies 506 to emit at a spectral power distribution including a peak emission wavelength corresponding to excitable wavelength for the cooking platform 516. By tuning to include the peak emission wavelength to the excitable wavelength of the cooking platform 516, the filament assemblies 506 can heat up the cooking platform 516 directly at a magnitude significantly greater than directly heating the air or the food inside the chamber 502.

The cooking platform 516 can be made of glass or metal. The cooking platform 516 can include an optically transparent region, such as via glass or glass-like material, enabling visible light to substantially travel through two opposing surfaces of the cooking platform 516. For example, prior to heating, a user of the cooking instrument 500 can place an instruction sheet beneath the cooking platform 516 while arranging food on the cooking platform 516 to be cooked. The user can directly overlay specific food at the desired location according to the instruction sheet. In some embodiments, the cooking platform 516 includes a reflective portion 518 to enable a top side camera 522 to capture a bottom view of food resting on the cooking platform 516.

In some embodiments, the cooking instrument 500 includes an airflow-based cooling system (e.g., including a cooling unit 520A, a cooling unit 520B, a cooling unit 520C, a cooling unit 520D, a cooling unit 520E, and a cooling unit 520F, collectively as the "cooling system 520"). The airflow-based cooling system 520 can blow directly onto a reflector portion of the containment vessel 508 to cool (e.g., prevent vaporization of the reflective coating) and/or improve performance of the reflector 511. The airflow can be controlled to provide impingement convection heating. The airflow-based cooling system 520 can have an air path that filters steam and thus prevents hot air from escaping when the door of the cooking instrument 500 is opened. The air path can also be configured to go over a camera (not shown) of the cooking instrument 500 to keep the lens of the camera condensation free.

In some embodiments, a fan can be installed away from the filament assemblies 506. When the spectral power distribution (including one or more peak wavelengths) of a filament assembly is configured to heat the envelope and/or the containment vessel 508, the fan can stir the air within the chamber 502 to ensure that heated air adjacent to the containment vessels 508 is moved to other parts of the chamber 502 to cook the food.

In some embodiments, the cooking instrument 500 lacks a crumb tray. Optionally, the cooking instrument 500 can use a heat resistant sheet 520 (e.g., quartz or other material) to cover the filament assemblies 506 so that the bottom of the cooking instrument chamber has no filament assemblies to trip over. The heat resistant sheet can be transparent at the operating wavelengths of the filament assemblies 506 to enable for the emission from the filament assemblies 506 to penetrate through without much loss.

In some embodiments, the computing device within the cooking instrument 500 can drive the filament assemblies 506 according to instructions in a cooking recipe. For example, the computing device can drive at least one of the filament assemblies 506 at a peak wavelength. The peak wavelength can correspond to excitable wavelengths of the materials in the cooking platform 516, the containment vessel 508 (e.g., envelope of the filament assembly), a specific type of edible material, water molecules, or any combination thereof. By matching a particular peak wavelength corresponding to an excitable wavelength of a target material, the computing device can target specific material for heating. For example, the computing device can drive at least one of the filament assemblies 506 at a peak wavelength (e.g., 3 μm or above for a glass cooking platform) such that the cooking platform 516 is substantially opaque to waves emitted from the at least one of the filament assemblies 506. The computing device can drive at least one of the filament assemblies 506 at a peak wavelength (e.g., 3 μm or less for glass cooking platforms) such that the cooking platform 516 is substantially transparent to waves emitted from the at least one of the filament assemblies 506. The computing device can drive at least one of the filament assemblies 506 at a peak wavelength (e.g., between 3 μm and 4 μm for glass cooking platforms) such that the cooking platform 516 is heated by waves emitted from the at least one of the filament assemblies 506 without heating any organic food in the cooking chamber.

Figure 5B:
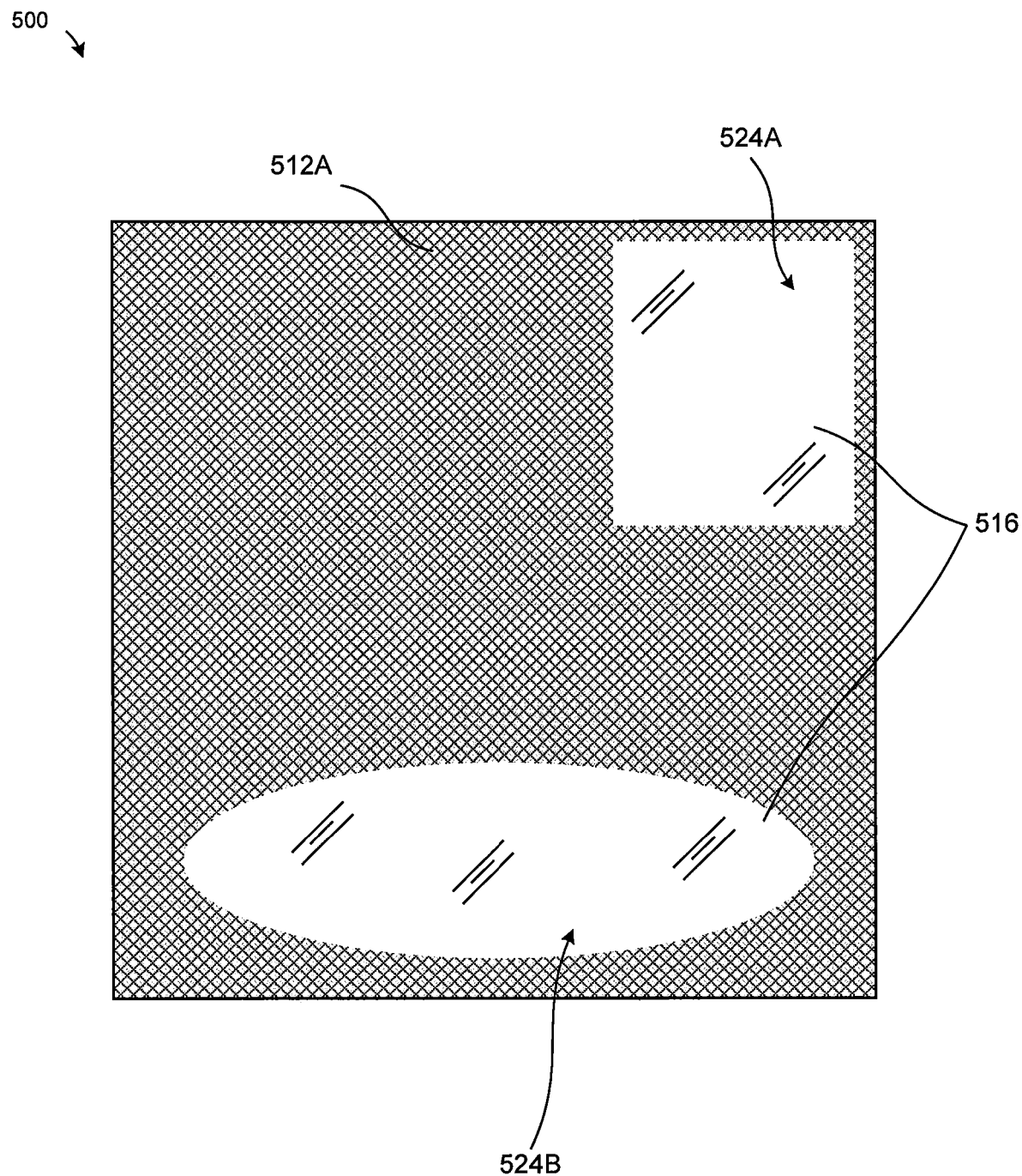
FIG. 5B is a cross-sectional top view of the cooking instrument of FIG. 5A along lines A-A', in accordance with various embodiments.

FIG. 5B is a cross-sectional top view of the cooking instrument 500 of FIG. 5A along lines A-A', in accordance with various embodiments. FIG. 5B can illustrate the perforated metal sheet 512A and cavities within the perforated metal sheet 512A that exposes the cooking platform 516. For example, the perforated metal sheet 512 includes a rectangular cavity 524A and an oval cavity 524B that exposes the cooking platform 516 underneath.

Figure 5C:
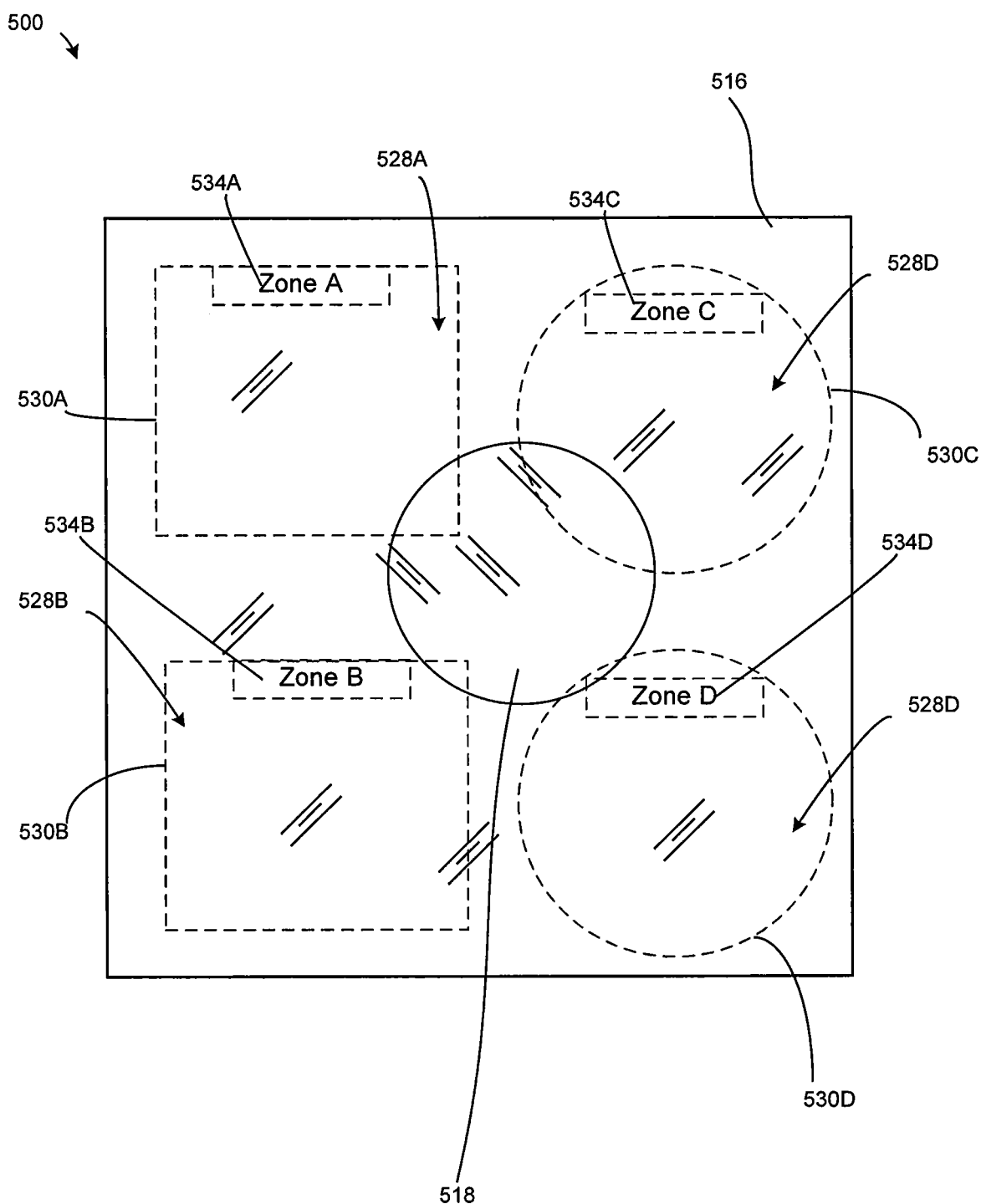
FIG. 5C is a cross-sectional top view of the cooking instrument of FIG. 5A along lines B-B', in accordance with various embodiments.
Figure 5D:
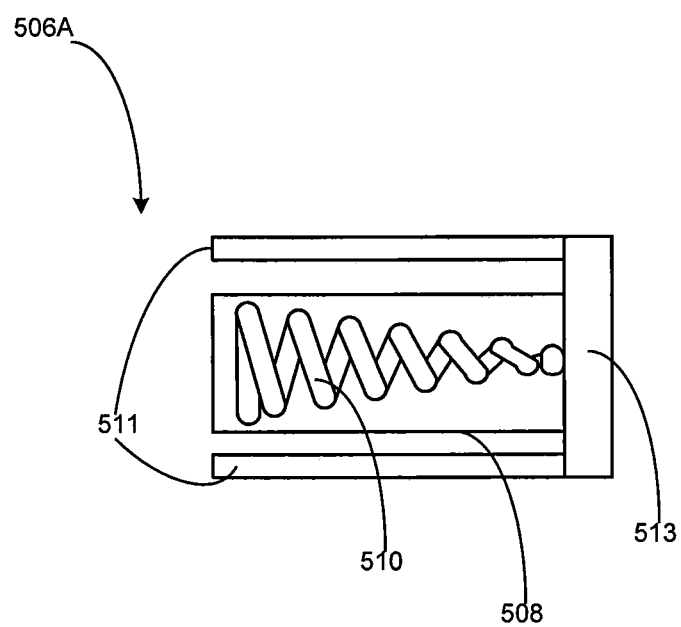
FIG. 5D is an example cross-section of one of the filament assemblies, in accordance with various embodiments.

FIG. 5C is a cross-sectional top view of the cooking instrument 500 of FIG. 5A along lines B-B', in accordance with various embodiments. FIG. 5C can illustrate the cooking platform 516. In embodiments where the cooking platform 516 is transparent or semi-transparent, the reflective portion 518 may be visible from the cross-sectional top view.

In some embodiments, the cooking platform 516 can be virtually divided into cooking target zones (e.g., zone 528A, zone 528B, zone 528C, and zone 528D, collectively as the "cooking target zones 528"). That is, food cooking recipes and heating sequences can reference these cooking target zones 528. Each of the cooking target zones 528 can be defined by physically visible perimeters (e.g., a zone A perimeter 530A, a zone B perimeter 530B, a zone C perimeter 530C, and a zone D perimeter 530D, collectively as the "visible perimeters 530"). The visible perimeters 530 can be of different sizes and shapes (e.g., overall or rectangular). In some embodiments, the visible perimeters 530 can be marked by heat resistant paint. In some embodiments, the visible perimeters 530 can be defined by structural channeled edges or beveled edges in the cooking platform 516. In some embodiments, each of the visible perimeters 530 can be defined by the corresponding cooking target zone being terraced (e.g., elevated or depressed).

In some embodiments, the cooking target zones 528 can include visible labels (e.g., a zone A label 534A, a zone B label 534B, a zone C label 534C, and a zone D label 534D, collectively as the "visible labels 534"). The visible labels 534 can advantageously provide a clear reference for a user to know where to place portions of food as instructed by the cooking instrument 500 (e.g., via displayed information related to instructions associated with a cooking recipe).

Figure 6:
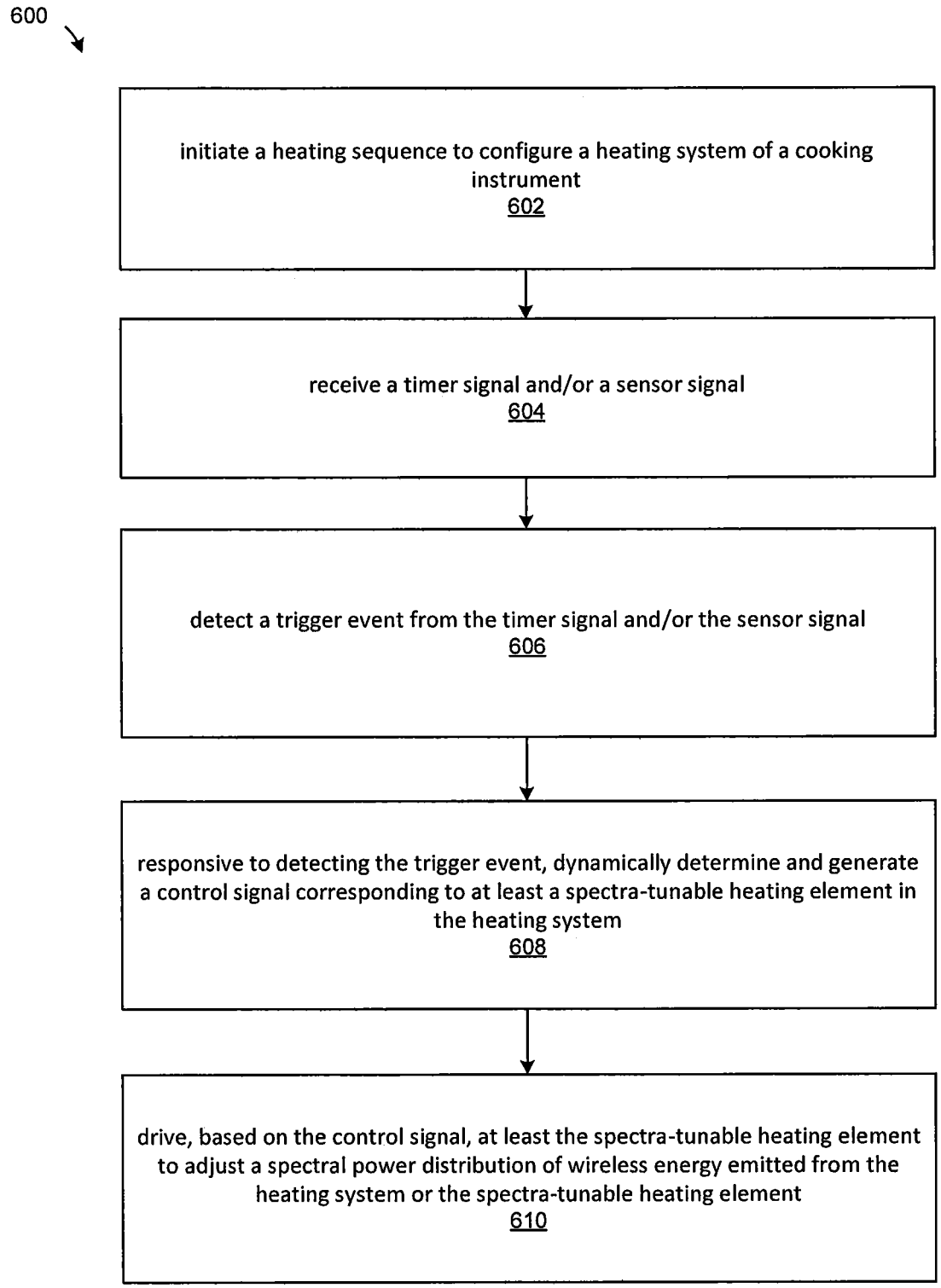
FIG. 6 is a flow chart illustrating a method of operating a cooking instrument, in accordance with various embodiments.

FIG. 6 is a flow chart illustrating a method 600 of operating a cooking instrument (e.g., the cooking instrument 100, the cooking instrument 200, and/or the cooking instrument 500), in accordance with various embodiments. The method 600 can be executed by a control system (e.g., the computing device 206) of the cooking instrument. At step 602, the control system can initiate a heating sequence to configure a heating system (e.g., the heating system 216) of the cooking instrument. For example, configuration of the heating system includes configuration of individual spectra-tunable heating elements. The heating sequence can include instructions to configure at least a spectra-tunable heating element of the heating system.

At step 604, the control system can then receive a timer signal and/or a sensor signal. The timer signal can be a continuous data stream of time indicators or discrete data packets (e.g., periodic or otherwise) indicative of time. The sensor signal can be a continuous data stream of sensor measurements or discrete sensor measurements (e.g., periodic or otherwise). The continuous data streams can be uninterrupted while the heating system is operating.

At step 606, the control system can detect a trigger event from the timer signal and/or the sensor signal. Responsive to detecting the trigger event, at step 608, the control system can dynamically determine and generate a control signal corresponding to at least the spectra-tunable heating element in the heating system. At step 610, the control system can drive, based on the control signal, at least the spectra-tunable heating element to adjust a spectral power distribution of wireless energy emitted from the heating system or the spectra-tunable heating element. Driving the heating system can include adjusting the spectral power distribution of the wireless energy by selectively turning off or selectively reducing intensity of power supplied to the at least one heating element in the heating system.

In some embodiments, the heating system adjusts the spectral power distribution while preserving the total output power of the heating system, such as by increasing an output intensity for a first wavelength spectrum while reducing an output intensity for a second wavelength spectrum. In some embodiments, the heating system adjusts the spectral power distribution without preserving the total output power. The first wavelength spectrum can be longer or shorter than the second wavelength spectrum. In the case that the first wavelength spectrum is longer, the heating system or the spectra-tunable heating element essentially targets direct heat transfer to a material with an absorption band that is longer in wavelength. In the case that the first wavelength spectrum is shorter, the heating system or the spectra tunable heating element essentially targets direct heat transfer with an absorption band that is shorter in wavelength.

In some embodiments, adjusting the spectral power distribution includes adjusting spectral power distribution of wireless energy emitted from only a subset of heating elements in the heating system. Here, "only a subset" means less than all of the heating elements in the heating system.

While processes or methods are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

FIG. 8 is a flow chart illustrating a method 800 of operating a cooking instrument (e.g., the cooking instrument 100, the cooking instrument 200, and/or the cooking instrument 500), in accordance with various embodiments. The method 800 can be executed by a control system (e.g., the computing device 206) of the cooking instrument. At step 802, the control system can hyperspectrally image, at least partially, inside a cooking chamber (e.g., the chamber 102) of the cooking instrument. Such hyperspectral imaging can utilize spatially scanning, spectral scanning, spatio-spectral scanning, or a non-scanning methodology.

Step 802 can include a sub-step 804 of illuminating, at least partially, the cooking chamber with a lighting system (e.g., the light source 242 and/or the heating elements 218) and a sub-step 806 of capturing a spectral response image with at least two dimensions utilizing an imaging system (e.g., the image sensor system 222). Sub-steps 804 and 806 can be executed simultaneously or at least partially simultaneously such that the capturing process overlaps at least partially with the illuminating process. In some cases, illumination of the cooking chamber can include illuminating monochromatic light (e.g., substantially near a specific wavelength) or substantially monochromatic light (e.g., substantially within a spectral wavelength range). In some cases, illumination of the cooking chamber can include providing visible or near-visible light toward a cooking platform (e.g., the cooking platform 110) suspended in the cooking chamber. The lighting system can be capable of producing one or more monochromatic light waves (e.g., an infrared light source, a red light source, a blue light source, a green light source, an ultraviolet light source, or any combination thereof). The lighting system can illuminate, at least partially, the cooking chamber in a sequence of flashes at different chromatic settings, each chromatic setting corresponding to a configuration where the lighting system is emitting a particular type of monochromatic light waves.

The imaging system can include image sensors (e.g., the light sensors 706 of FIG. 7) sensitive to specific wavelengths respectively corresponding to the multiple monochromatic light waves. In some cases, each individual image sensor has a particular monochromatic sensitivity. In some cases, each individual image sensor is sensitive to the monochromatic light waves that the lighting system is configured to produce. The imaging system can include an image sensor array. For example, an image sensor in the image sensor array is capable of measuring intensity of electromagnetic waves at or substantially at a specific wavelength or a specific wavelength range corresponding to one of the monochromatic light sources. The image sensor array can include at least two different image sensors respectively capable of measuring intensity of electromagnetic waves at or substantially at respectively different wavelengths or wavelength ranges. In some embodiments, the imaging system can capture a three-dimensional spectral response image. In some embodiments, the imaging system can capture a plurality of spectral response images, each image with at least two dimensions. The imaging system can synchronize with the lighting system such that the plurality of images are respectively captured during a sequence of flashes.

At step 808, the control system can characterize (e.g., including identify or categorize) a material in the cooking chamber by analyzing the spectral response image. The control system can identify at least a pixel in the spectral response image matching a specific spectral response pattern (e.g., based on the pixel's intensity falling within a specific range when illuminated by a monochromatic light associated with the specific range. The control system can determine, based on the spectral response image, a composition and/or a location of the material in the cooking chamber. For example, chlorophyll is green in the visible spectrum, but it is extremely reflective (white) in the near infrared spectrum. Hyperspectral imaging can identify green leafy vegetables, even if they are ground into puree form or dramatically modified geometrically in a way that is not possible to identify easily visually, but is more easily identifiable in hyperspectral form. For example, to identify the material associated with a particular region, the control system can compare spectral response of a region to a spectral profile associated with a material. The control system can determine presence of a material by analyzing the plurality of spectral response images to identify at least a portion in the plurality of spectral response images matching specific spectral response patterns of the material's spectral profile. In some cases where an exact match is not determined, the control system can identify nearest spectral profiles to the regional spectral response and determine a blend of materials associated with the nearest spectral profiles. This way, the control system can identify, based on regional characteristics of the plurality of spectral response images, a target zone in the cooking chamber that contains the material.

At step 810, the control system can configure a heating system of the cooking instrument based on the determined presence of the material. For example, the control system can configure the spectral power distribution of the heating system to specifically and directly heat the identified material. The control system can also determine an area to target (e.g., the target zone) with the heating system corresponding to the particular region of the identified material. The heating system can be configured to directionally heat the target zone. The heating system can be configured to emit wireless energy with a spectral power distribution configured to directly heat the material.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Some embodiments of the disclosure have other aspects, elements, features, and steps in addition to or in place of what is described above. These potential additions and replacements are described throughout the rest of the specification.

The invention claimed is:

1. A cooking instrument comprising:
 a cooking chamber;
 a heating system including at least a tunable heating element capable of emitting wireless electromagnetic energy into the cooking chamber;
 an image sensor system sensitive to different types of chromatic light, the image sensor system facing the cooking chamber and capable of capturing a photo or a video of foodstuff when the heating system is at least partially on; and
 a control system configured to:
  execute a heating sequence to drive the heating system,
  generate a hyperspectral wavelength-specific response image based on an image of the foodstuff from the image sensor system;
  detect, based on the hyperspectral image of the foodstuff from the image sensor system, a trigger condition, wherein the trigger condition is specified by the heating sequence or a system wide threat detection setting and includes an identification of a foodstuff attribute, and
  responsive to detecting the trigger condition, configuring the heating system to adjust a spectral power distribution or power intensity of the emitted wireless electromagnetic energy from the tunable heating element.

2. The cooking instrument of claim 1, further comprising a marker within the cooking chamber to facilitate the control system to detect, utilizing machine vision tracking and positioning, relative location of at least a portion of the foodstuff.

3. The cooking instrument of claim 2, wherein the marker is removably attachable to the cooking chamber.

4. The cooking instrument of claim 2, further comprising a cooking platform on which to support the foodstuff in the cooking chamber; wherein the marker is removably attachable to the cooking platform.

5. The cooking instrument of claim 2, wherein the marker is integral or substantially permanently affixed to the cooking chamber.

6. The cooking instrument of claim 2, further comprising a cooking platform on which to support the foodstuff in the cooking chamber; wherein the marker is integral to or substantially permanently affixed to the cooking platform.

7. The cooking instrument of claim 1, further comprising a lighting system; wherein the image sensor system includes an image sensor that is sensitive to different types of chromatic light produced by the lighting system; and the control system is configured to generate the hyperspectral wavelength-specific response image from the image.

8. The cooking instrument of claim 7, wherein the lighting system and the heating system share at least the tunable heating element and wherein the tunable heating element is an infrared-based heating element.

9. The cooking instrument of claim 7, wherein the lighting system includes a static monochromatic light source or a color tunable monochromatic light source exposed in the cooking chamber.

10. The cooking instrument of claim 7, wherein the control system is configured to determine, based on the hyperspectral response image, the foodstuff attribute of foodstuff in the cooking chamber as the trigger condition.

11. The cooking instrument of claim 10, wherein the foodstuff attribute includes composition of the foodstuff, spatial dimension of the foodstuff, material of the foodstuff, cooked state of the foodstuff, phase of the foodstuff, or any combination thereof.

12. A cooking instrument comprising:
 a cooking chamber;
 a heating system including at least a tunable heating element capable of emitting wireless electromagnetic energy into the cooking chamber;
 an image sensor system facing the cooking chamber capable of capturing a photo or a video of foodstuff when the heating system is at least partially on;
 a control system configured to:
  execute a heating sequence to drive the heating system,
  detect, based on an image of the foodstuff from the image sensor system, a trigger condition, wherein the trigger condition is specified by the heating sequence or a system wide threat detection setting, and
  responsive to detecting the trigger condition, configuring the heating system to adjust a spectral power distribution or power intensity of the emitted wireless electromagnetic energy from the tunable heating element; and
 a lighting system;
 wherein the image sensor system includes an image sensor that is sensitive substantially only to and adapted to measure a specific monochromatic light produced by the lighting system; and the control system is configured to generate a hyperspectral wavelength-specific response image from the image.

13. A cooking instrument comprising:
 a cooking chamber;
 a heating system including at least a tunable heating element capable of emitting wireless electromagnetic energy into the cooking chamber;
 an image sensor system facing the cooking chamber capable of capturing a photo or a video of foodstuff when the heating system is at least partially on; and
 a control system configured to:
  execute a heating sequence to drive the heating system,
  detect, based on an image of the foodstuff from the image sensor system, a trigger condition, wherein the trigger condition is specified by the heating sequence or a system wide threat detection setting, and
  responsive to detecting the trigger condition, configuring the heating system to adjust a spectral power distribution or power intensity of the emitted wireless electromagnetic energy from the tunable heating element;
 wherein the control system is configured to synchronize the heating system with the image sensor system such that an exposure window of the image sensor system corresponds to when the heating system is off or when the heating system is substantially consistently producing electromagnetic waves at a specific wavelength or a specific wavelength range.

14. The cooking instrument of claim 13, wherein the heating system is configured to emit the wireless electromagnetic energy from the heating element at a color temperature that matches a color temperature configuration of a white-balancer of the image sensor system such that the heating element is usable as an illumination source when taking a photo of the cooking chamber using the image sensor system.

15. The cooking instrument of claim 1, further comprising a chamber window embedded in the cooking chamber and allowing optical light to pass therethrough; wherein the cooking chamber includes a slit therethrough; and wherein the image sensor system faces the chamber window.

16. The cooking instrument of claim 1, further comprising a color filter adapted to remove spectral content corresponding to a particular wavelength or wavelength range from optical light within the cooking chamber traveling toward the image sensor system; wherein the wireless electromagnetic energy leans toward the particular wavelength or the particular wavelength range.

17. The cooking instrument of claim 16, wherein the color filter is a red cut filter or a blue light filter.

18. The cooking instrument of claim 1, further comprising a cooking platform adapted to support the foodstuff in the cooking chamber; wherein the heating sequence includes a foodstuff searing sequence configured to drive the heating system to sear the foodstuff on a bottom surface of the foodstuff interfacing with the cooking platform; wherein the foodstuff searing sequence configures the heating system to emit electromagnetic waves at a specific wavelength or a specific wavelength range, which electromagnetic waves substantially pass through the cooking platform, cook the bottom surface of the foodstuff while substantially not penetrating through a top surface of the foodstuff.

19. The cooking instrument of claim 1, wherein the image sensor system has a camera window with an oliophobic coating.

20. A method of operating the cooking instrument of claim 12, comprising:
    illuminating, at least partially, the cooking chamber of the cooking instrument with the lighting system in a sequence of flashes at different chromatic settings, each chromatic setting corresponding to a lighting configuration corresponding to emission of a particular spectrum of monochromatic light waves;
    capturing a plurality of spectral response images utilizing the image sensor system, each spectral response image with at least two spatial dimensions, wherein the plurality of images are captured respectively to the sequence of flashes, and wherein the image sensor system is at least sensitive to wavelengths corresponding to the different chromatic settings;
    determining presence of a material by analyzing the plurality of spectral response images to identify at least a portion in the plurality of spectral response images matching one or more spectral response patterns; and
    configuring the heating system of the cooking instrument based on the determined presence of the material.

21. The method of claim 20, wherein said determining includes identifying, based on regional characteristics of the plurality of spectral response images, a target zone in the cooking chamber that contains the material.

22. The method of claim 21, wherein said configuring includes configuring the heating system to directionally heat the target zone.

23. The method of claim 20, wherein said configuring includes configuring the heating system to emit wireless electromagnetic energy with a spectral power distribution configured to directly heat the material.

24. The cooking instrument of claim 13, further comprising a microphone and wherein detecting the trigger event includes monitoring a continuous audio stream for sound of popping, boiling, sizzling, or other sound indicative of a change in phase or state of foodstuff in the cooking chamber.

25. The cooking instrument of claim 13, further comprising a volatile organic compound sensor and wherein detecting the trigger event includes performing a particulate analysis to identify specific aerial material associated with a change in phase or state of foodstuff in the cooking chamber.

26. The cooking instrument of claim 13, further comprising a second sensor; and wherein the control system is configured to detect based on an open-ended data stream of the image sensor system and the second sensor.

27. The cooking instrument of claim 26, wherein the image sensor system is adapted to produce a first dimension of information and the second sensor is adapted to produce a second dimension of information.

28. The cooking instrument of claim 26, wherein the trigger event is a fire presence event, a smoke presence event, a condensing steam presence event, or any combination thereof.

* * * * *